(12) United States Patent
Bozkaya et al.

(10) Patent No.: US 12,220,813 B1
(45) Date of Patent: Feb. 11, 2025

(54) CALIBRATION GARAGE FOR AUTOMATED CALIBRATION OF DEPTH SENSORS IN MOBILE ROBOTS

(71) Applicant: Amazon Technologies, Inc., Seattle, WA (US)

(72) Inventors: Dincer Bozkaya, Andover, MA (US); Sara Jean Woo, Andover, MA (US); William Joseph Klein, Londonderry, NH (US); Jing Ma, Salt Lake City, UT (US); Gregory Cartagena, Boston, MA (US); Justin Croyle, Hampstead, NH (US); Gabriel Hebert, Wakefield, MA (US); Fahrudin Alagic, Lynn, MA (US); Stephen A. Caldara, Falmouth, MA (US)

(73) Assignee: Amazon Technologies, Inc., Seattle, WA (US)

( * ) Notice: Subject to any disclaimer, the term of this patent is extended or adjusted under 35 U.S.C. 154(b) by 481 days.

(21) Appl. No.: 17/361,843

(22) Filed: Jun. 29, 2021

(51) Int. Cl.
| | |
|---|---|
| B25J 19/02 | (2006.01) |
| B25J 9/16 | (2006.01) |
| G01C 21/00 | (2006.01) |
| G01C 25/00 | (2006.01) |
| G06Q 10/087 | (2023.01) |

(52) U.S. Cl.
CPC ............. B25J 19/02 (2013.01); B25J 9/1694 (2013.01); G01C 21/3819 (2020.08); G01C 25/005 (2013.01); G06Q 10/087 (2013.01)

(58) Field of Classification Search
CPC ....... B25J 19/02; B25J 9/1694; G06Q 10/087; G01C 21/3819; G01C 25/005
USPC .......................................................... 705/28
See application file for complete search history.

(56) References Cited

U.S. PATENT DOCUMENTS

| | | | |
|---|---|---|---|
| 2018/0080819 A1* | 3/2018 | Kramer | G01J 1/4257 |
| 2020/0200566 A1* | 6/2020 | Kim | G06Q 10/047 |
| 2021/0215811 A1* | 7/2021 | Couture | G01S 17/931 |

FOREIGN PATENT DOCUMENTS

| | | | | |
|---|---|---|---|---|
| CN | 109829953 A | * | 5/2019 | |
| JP | H085351 A | * | 1/1996 | |
| WO | WO-2020264089 A1 | * | 12/2020 | ............. G01C 19/54 |
| WO | WO-2021178163 A1 | * | 9/2021 | ............. G01S 17/87 |

* cited by examiner

*Primary Examiner* — Luna Champagne
(74) *Attorney, Agent, or Firm* — Eversheds Sutherland (US) LLP

(57) ABSTRACT

Systems and techniques for performing a calibration test of an obstacle detection sensor of a drive unit are described. An example system includes a calibration region and at least one drive unit. The calibration region is disposed in an environment and includes a calibration apparatus. The at least one drive unit is operable to autonomously move throughout the environment. The at least one drive unit includes a sensor configured to detect one or more objects within the environment. The at least one drive unit is configured to autonomously transition to the calibration region upon detecting at least one predetermined condition, and perform a calibration test of the first sensor at the calibration region using the calibration apparatus.

19 Claims, 18 Drawing Sheets

CALIBRATION GARAGE FOR AUTOMATED CALIBRATION OF DEPTH SENSORS IN MOBILE ROBOTS

BACKGROUND

The present invention generally relates to the operation of drive units within an inventory system, and more specifically, to techniques and apparatus for assessing and correcting the calibration of sensors in a drive unit.

Movement of products in a modern warehouse environment, such as a package sort center, in which packages are moved within a facility, occurs on a vast scale. One means to sort packages (i.e., payloads) is to use drive units to deliver packages to destinations designated by the ultimate final destination of the package. For example, drive units can be used to organize packages based on delivery route, as determined based on a postal code or other package features. In some cases, the drive units can travel to shelving systems to retrieve items, or the shelves themselves, and return them to a location for additional processing. Drive units can be self-powered, autonomous robotic devices that travel on the floor of the warehouse.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Figure 1:
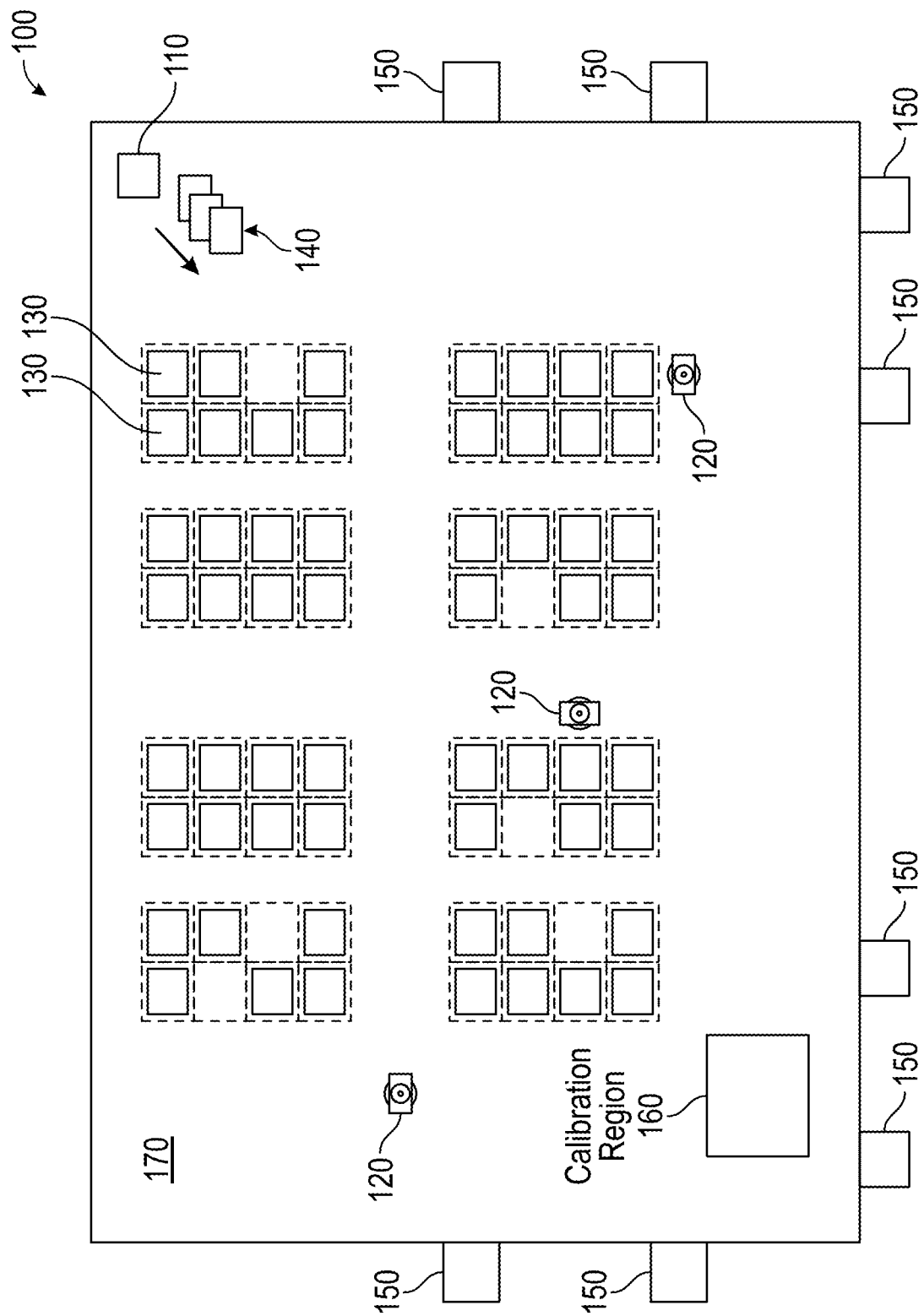
FIG. 1 is a block diagram of an inventory system, according to one embodiment.

Many facilities (e.g., inventory systems, warehouses, distribution centers, storehouses, factories, etc.) employ drive units to transport items to various locations within the facilities. In some cases, the drive units may encounter various obstacles while transporting items within a facility. In an inventory system, for example, some items (or objects) can fall to the floor from various containers and obstruct the path of one or more drive units. In some cases, the items can be run over by the drive units, increase the amount of time it takes for the drive unit to transport an item, etc.

A drive unit may be equipped with an obstacle detection system that can detect objects in the path of the drive unit. The obstacle detection system, for example, can include one or more obstacle detection sensors (ODSs). Based on the information from the obstacle detection system, the drive unit can adjust its path to avoid colliding with the objects. Generally, once a number of drive units identify an obstacle(s) in a given region of the facility (e.g., a particular location within a predefined area), one or more personnel can be alerted to remove the obstacle(s). Consequently, the ability of the drive units to accurately and to reliably identify various obstacles within the facility can impact the efficiency of facility operations.

In embodiments described herein, a drive unit can use a stereo camera as an ODS. A stereo camera generally includes two imaging cameras (also referred to as imagers or cameras) that are placed at a predefined (or known) distance from each other. This distance between the imaging cameras is also referred to as the baseline. The stereo camera can be used to determine (e.g., measure or estimate) depth(s) (or distances) to various objects in an environment, based on the disparity between two images of the environment (or scene) captured from the two imaging cameras. The depth accuracy of the stereo camera is generally a function of intrinsic parameters (e.g., the calibration of each imaging camera) and extrinsic parameters (e.g., the calibration of the two imaging cameras with respect to each other). In many cases, small changes in calibration of the stereo camera due to shock, vibration, temperature changes and other various phenomena, can result in loss of depth accuracy. The loss in depth accuracy can in turn impact the ability of the drive unit to accurately and to reliably identify obstacles in an environment.

To address this, embodiments described herein provide techniques and apparatus for detecting when a drive unit's sensors (e.g., ODS(s)) are out of calibration (or uncalibrated). More specifically, embodiments provide a designated calibration region (also referred to a calibration location or calibration area) in an environment where drive units can autonomously transition to and undergo a calibration test (or check). If the drive unit does not pass the calibration test (e.g., one or more depth metrics do not satisfy a predetermined condition(s) or threshold(s)), the drive unit can undergo a recalibration procedure at the designated calibration region. In one embodiment, the designated calibration region is in a structured environment (e.g., a structured field). In another embodiment, the designated calibration region is in an unstructured environment (e.g., an unstructured field).

Embodiments may provide a calibration apparatus (also referred to herein as a calibration garage) at the designated calibration region that drive units can use to autonomously perform a calibration test and/or a recalibration procedure. In one embodiment, the calibration apparatus includes multiple targets (also referred to herein as "calibration targets"), each located at different distances from the drive unit's position within the calibration region. In one particular embodiment, for example, the calibration apparatus includes (i) a first target located at a first distance from the drive unit's position within the calibration region and (ii) a second target located at a second distance from the drive unit's position within the calibration region, where the second distance is greater than the first distance.

In some embodiments, the multiple targets can be presented to the drive unit's ODS (e.g., stereo camera) at different distances within the same scene (e.g., the same field-of-view (FOV) of the stereo camera). In embodiments where the calibration apparatus includes two targets, for example, the first target (at the first distance) may include a window portion cut out from the first target, so that the ODS has visibility to the second target (at the second distance) through the window portion of the first target.

The targets can be used to perform a calibration test of the drive unit's ODS. The calibration test may involve evaluating the performance of the ODS according to one or more depth metrics, including, for example, fill ratio (also known as valid pixel percentage), depth accuracy (also known as absolute accuracy), etc. In embodiments where the calibration apparatus includes two targets, the first and second targets can be used to perform a fill ratio test of the drive unit's ODS. For example, the first target along with the portion of the second target visible through the window portion of the first target can be used to fill in the FOV of the ODS. Embodiments can then determine the number (or fraction) of valid depth pixels across the entire FOV of the ODS as the fill ratio. Additionally or alternatively, the first target and/or second target can be used to perform a depth accuracy test of the drive unit's ODS. For example, the reported depth values from the ODS's output can be compared to the actual distances of the first and/or second targets to determine the depth accuracy of the ODS. In some cases, the actual distance may be the distance between the drive unit's position within the calibration region and the second target. In other cases, the actual distance may be the relative distance between the first and second targets.

Embodiments may determine whether a drive unit's ODS has lost calibration based on the values for the one or more depth metrics. For example, embodiments may determine that one or more of the values for the one or more depth metrics satisfies a predetermined condition (e.g., value of a given depth metric is less than a threshold associated with that depth metric). In response to determining that the depth metric values satisfy the predetermined condition for loss of calibration, embodiments may determine that the ODS has lost calibration and may initiate a recalibration procedure of the ODS, e.g., using the multiple targets within the calibration apparatus. In this manner, embodiments enable a drive unit to autonomously perform calibration tests to determine whether the drive unit's sensors have lost calibration due to, e.g., shock, vibration, temperature changes, and other phenomena encountered during its operation within a facility (or other environment). This, in turn, enables the drive unit to autonomously diagnose calibration failures and correct them without manual intervention.

FIG. 1 is a block diagram of an example inventory system 100, according to one embodiment. The inventory system 100 includes a control system 110, one or more drive units 120 (also referred to as autonomous surface vehicles, autonomous robotic vehicles, mobile drive units, etc.), one or more inventory holders 130, one or more inventory stations 150, and a calibration region 160.

Each drive unit 120 can transport the inventory holders 130 between locations within a workspace 170 in response to commands communicated by the control system 110. Each inventory holder 130 is dimensioned to store one or more types of inventory items. In some cases, fiducials (or fiducial markers) may be placed on the floor of the workspace 170 to demarcate different regions, such as different functional regions, within the workspace 170, and/or to provide navigational references for the drive unit 120. The inventory system 100 is capable of moving inventory items between locations within the workspace 170 to facilitate the entry, processing, and/or removal of inventory items from the inventory system 100 and the completion of other tasks involving the inventory items.

The workspace 170 represents an area associated with the inventory system 100 in which the drive units 120 can move and/or the inventory holders 130 can be stored. For example, the workspace 170 may represent all or part of the floor of a mail-order warehouse in which the inventory system 100 operates. Although FIG. 1 shows, for the purposes of illustration, an embodiment of the inventory system 100 in which the workspace 170 includes a fixed, predetermined, and finite physical space, particular embodiments of the inventory system 100 may include drive units 120 and inventory holders 130 that are configured to operate within a workspace 170 that is of variable dimensions and/or of an arbitrary geometry. Similarly, while FIG. 1 illustrates a particular embodiment of the inventory system 100 in which the workspace 170 is entirely enclosed in a building, alternative embodiments may utilize workspaces 170 in which some or all of the workspace 170 is located outdoors, within a vehicle (such as a cargo ship), or otherwise unconstrained by any fixed structure.

The control system 110 assigns tasks to appropriate components of the inventory system 100, and coordinates operation of the various components in completing the tasks. These tasks may relate not only to the movement and processing of inventory items, but also to the management and maintenance of the components of the inventory system 100. For example, the control system 110 may assign portions of the workspace 170 for "parking" the drive units 120, for recharging and/or replacing batteries of the drive units 120, the storage of empty inventory holders 130, or any other operations associated with the functionality supported by the inventory system 100 and its various components. In one embodiment described herein, the control system 110 may configure the drive units 120 to transition to the calibration region 160 to perform a calibration test and/or recalibration procedure (e.g., a self-calibration procedure).

The control system 110 may select components of the inventory system 100 to perform these tasks and communicate appropriate commands and/or data to the selected components to facilitate completion of these operations. For example, the control system 110 can generate and transmit task assignments 140 to the selected components to trigger completion of the relevant tasks. Each task assignment 140 defines one or more tasks to be completed by a particular component. The tasks may relate to the retrieval, storage, replenishment, and counting of inventory items and/or the management of the drive units 120. Depending on the component and task to be completed, a particular task assignment 140 may identify locations, components, and/or actions associated with the corresponding task and/or any other appropriate information to be used by the relevant component in completing the assigned task.

With respect to the drive units 120 specifically, the control system 110 may, in particular embodiments, communicate task assignments 140 to selected drive units 120 that identify one or more destinations for the selected drive units 120. For example, the control system 110 may communicate a task assignment 140 that identifies the location of the calibration region 160. The control system 110 may select a drive unit 120 to assign the relevant task based on the location or state of the selected drive unit 120, an indication that the selected drive unit 120 has completed a previously-assigned task, a predetermined schedule, and/or any other suitable consideration. These destinations may be associated with an inventory request that the control system 110 is executing or a management objective that the control system 110 is attempting to fulfill. For example, the task assignment may define the location of an inventory holder 130 to be retrieved, an inventory station 150 to be visited, a storage location where the drive unit 120 should park until receiving another task, the location of the calibration region 160, or a location associated with any other task appropriate based on the configuration, characteristics, and/or state of the inventory system 100, as a whole, or individual components of the inventory system 100.

Although shown in FIG. 1 as a single, discrete component, the control system 110 may represent multiple components and may represent or include portions of the drive units 120 and/or other elements of the inventory system 100. As a result, any or all of the functionality of the control system 110 that is described herein may, in particular embodiments, represent functionality of a drive unit 120 (e.g., a controller within the drive unit 120).

As part of completing various task assignments 140, the drive units 120 can move the inventory holders 130 between locations within the workspace 170. For example, the drive units 120 may dock with and transport the inventory holders 130 within the workspace 170. The drive units 120 may represent any devices or components appropriate for use in the inventory system 100 based on the characteristics and configuration of the inventory holders 130 and/or other elements of the inventory system 100. In a particular embodiment of the inventory system 100, the drive units 120 represent autonomous robotic vehicles that can move about the workspace 170. One or more of the drive units 120 can be equipped with an ODS, such as a stereo camera, that enables the drive unit(s) to detect obstacles (e.g., items or objects) and alert human operators to the location of the obstacles, so that the obstacles can be removed.

In one embodiment, the drive units 120 can operate without human intervention in a structured area (or field) that includes fiducials (arranged in a grid or pattern), which are detected by sensors on the drive units. In this embodiment, a drive unit 120 may be equipped with sensors for locating the fiducials and the drive unit 120 may use the fiducials to navigate and maneuver within the workspace 170. In another embodiment, the drive units 120 can operate without human intervention in an unstructured area (or field) that does not contain fiducials. In this embodiment, a drive unit 120 may be equipped with autonomous navigation functions and/or sensors that enable the drive unit to maneuver within the workspace 170 without the use of fiducials. The contents and operation of an example embodiment of a drive unit 120 are discussed further below with respect to FIGS. 2A and 2B.

Additionally, the drive units 120 may be capable of communicating with the control system 110 to receive information identifying selected inventory holders 130, to transmit the locations of the drive units 120, to transmit image data for images of fiducials captured by the drive units 120, and/or to exchange any other suitable information to be used by the control system 110 or the drive units 120 during operation. The drive units 120 may communicate with the control system 110 wirelessly, using wired connections between the drive units 120 and the control system 110, and/or in any other appropriate manner. As one example, particular embodiments of the drive units 120 may communicate with the control system 110 and/or with one another using IEEE 802.11, Bluetooth, or Infrared Data Association (IrDA) standards, or any other appropriate wireless communication protocol. As another example, in a tracked implementation of the inventory system 100, tracks or other guidance elements upon which the drive units 120 move may be wired to facilitate communication between the drive units 120 and other components of the inventory system 100. In general, the drive units 120 may be powered, propelled, and controlled in any manner appropriate based on the configuration and characteristics of the inventory system 100.

Each of the inventory holders 130 stores inventory items of the inventory system 100. In a particular embodiment, the inventory holders 130 include multiple storage bins with each storage bin capable of holding one or more types of inventory items. The inventory holders 130 are capable of being carried, rolled, and/or otherwise moved by the drive units 120. The inventory items represent any objects suitable for storage, retrieval, and/or processing in the inventory system 100. For the purposes of this description, "inventory items" may represent any one or more objects of a particular type that are stored in the inventory system 100. Thus, a particular inventory holder 130 is currently "storing" a particular inventory item if the inventory holder 130 currently holds one or more units of that type. As one example, the inventory system 100 may represent a mail-order warehouse facility, and inventory items may represent merchandise stored in the mail-order warehouse facility. During operation, the drive units 120 may retrieve the inventory holders 130 containing one or more inventory items that are requested in an order to be packed for delivery to a customer, or retrieve inventory holders 130 carrying pallets containing aggregated collections of inventory items for shipment. Moreover, in particular embodiments of the inventory system 100, boxes containing completed orders may themselves represent inventory items.

The inventory stations 150 represent locations designated for the completion of particular tasks involving inventory items. Such tasks may include the removal of inventory items from the inventory holders 130, the introduction of inventory items into the inventory holders 130, the counting of inventory items in the inventory holders 130, the decomposition of inventory items (e.g., separating from pallet-sized or case-sized groups into individual inventory items), the consolidation of inventory items between the inventory holders 130, and/or the processing or handling of inventory items in any other suitable manner.

In some embodiments, one or more inventory stations 150 represents a location at which the inventory system 100 is externally accessible by human operator(s) and/or robotic system(s) external to the inventory system 100. In some embodiments, the workspace 170 may be externally bounded by walls or a fence to prevent or limit access to the workspace 170 by human operator(s) (e.g., a structured environment), and each of the inventory stations 150 is arranged at a respective opening in the walls or fence. In other embodiments, the workspace 170 is not externally bounded (e.g., an unstructured environment). In some embodiments, the inventory system 100 is configured so that both drive units 120 and human operator(s) may navigate through the workspace 170 and interact with various components of the inventory system 100.

As noted, in some cases, a drive unit's ODS (e.g., stereo camera) may lose calibration over the course of the drive unit's operation. The loss in calibration may be due to the drive unit 120 experiencing various types of phenomena, including, for example, shock, vibrations, temperature changes, humidity, etc. The resulting loss in calibration, in turn, may impact the ability of the ODS to accurately and reliably identify various objects within the workspace 170, impacting operations within the workspace 170.

To address this, embodiments provide a calibration region 160, which is a designated area (or location) where the drive units 120 can autonomously travel to and perform calibration tests, e.g., to determine whether an ODS has lost calibration. In cases where a drive unit 120 does not pass the calibration test, embodiments may autonomously initiate a recalibration procedure within the calibration region 160 to correct the calibration of the drive unit's ODS.

As shown in FIG. 1, the calibration region 160 is located within the workspace 170, which may be a structured field or an unstructured field. The drive units 120 may be configured, via the control system 110, to perform calibration tests based on occurrence of a predetermined condition. The predetermined condition, for example, can include, a time interval (e.g., a predefined amount of time has elapsed since a prior calibration test or a prior recalibration of the drive unit's ODS), an instruction, a predefined event (e.g., a collision with an object), etc. The calibration region 160 is described in more detail below with respect to FIGS. 3A, 3B, 3C, and 4.

Figure 2A:
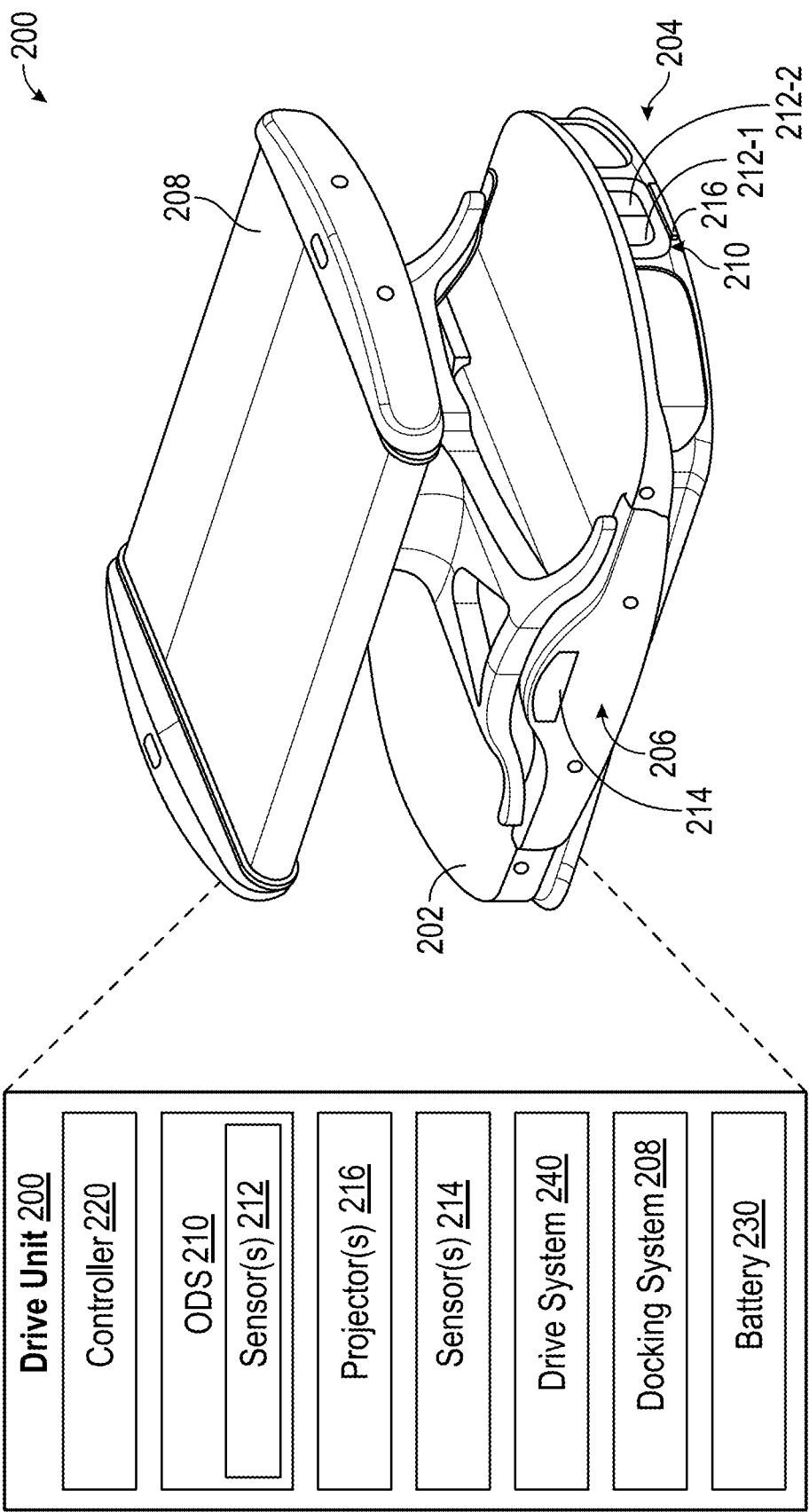
FIG. 2A illustrates a perspective view of a drive unit, according to one embodiment.
Figure 2B:
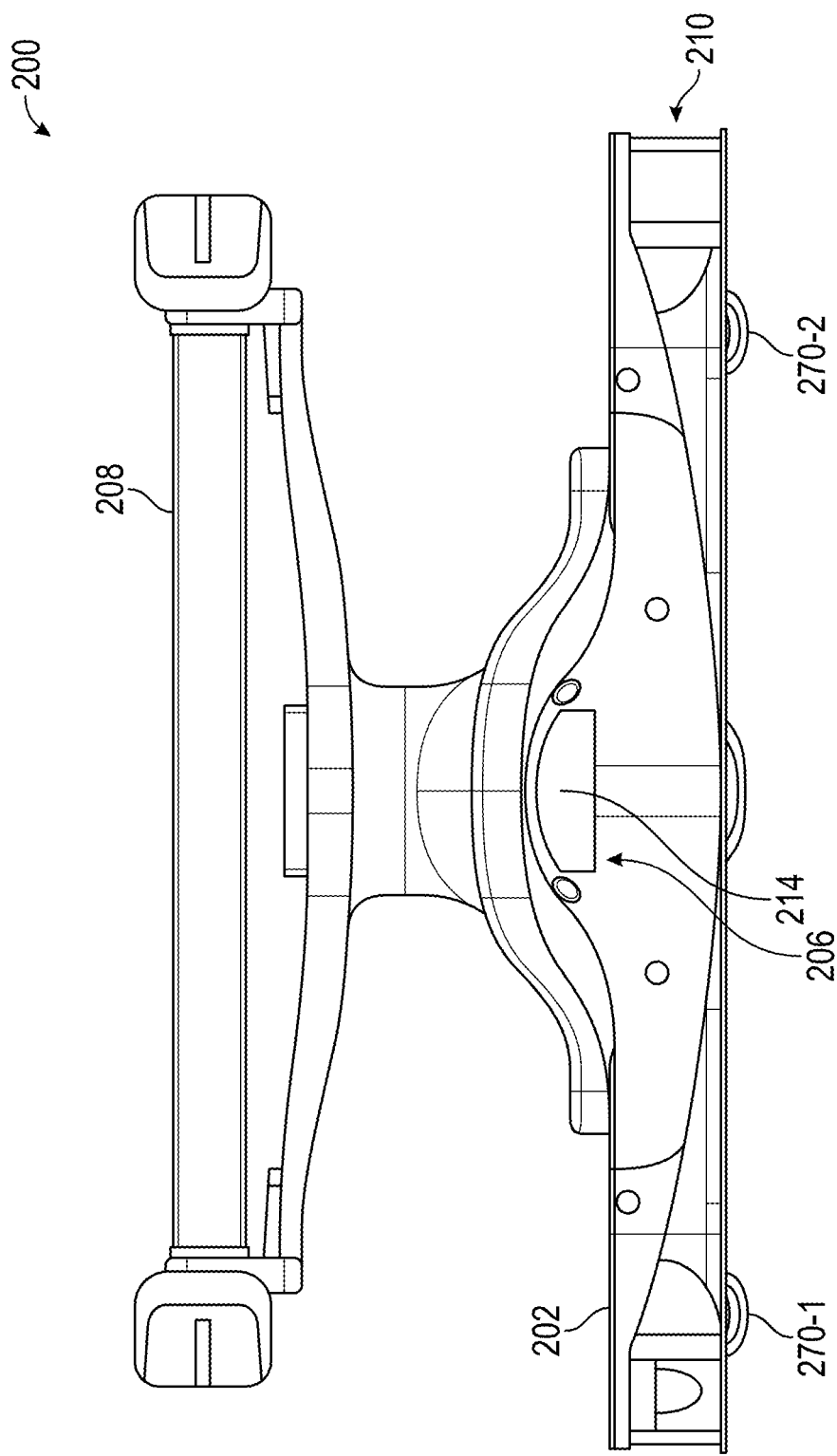
FIG. 2B illustrates a side view of a drive unit, according to one embodiment.

FIG. 2A is a perspective view of a drive unit 200 and FIG. 2B is a side view of the drive unit 200, according to one embodiment. The features illustrated in FIGS. 2A and 2B may be used in conjunction with other embodiments. For example, the drive unit 200 may represent one possible implementation of the drive unit 120 illustrated in FIG. 1.

The drive unit 200 includes a body 202 dimensioned to house various components and/or systems of the drive unit 200. For example, the body 202 can form a protective enclosure for the components and/or systems. The body 202 may be formed of one or more housing components of any suitable materials. The body 202 houses a forward panel 204, a side panel 206, and a docking system 208. The body 202 can also house a controller 220, a drive system 240, and a power storage device (e.g., battery 230) that provides electrical power to the components (e.g., forward panel 204, side panel 206, docking system 208, controller 220, drive system 240, etc.) of the drive unit 200.

The docking system 208 is configured to couple the drive unit 200 to an inventory holder 130 and/or support the inventory holder 130 when the drive unit 200 is docked to the inventory holder 130. The docking system 208 may additionally allow the drive unit 200 to maneuver the inventory holder 130, such as by lifting the inventory holder 130, propelling the inventory holder 130, rotating the inventory holder 130, and/or moving the inventory holder 130 in any other appropriate manner.

The controller 220 can include one or more computer processors (also referred to as processors) and a memory. The one or more computer processors may be implemented in any suitable form, such as a general purpose microprocessor, an application-specific integrated circuit (ASIC), and so forth. The memory may include a variety of computer-readable media selected for their size, relative performance, or other capabilities: volatile and/or non-volatile media, removable and/or non-removable media, etc. The controller 220 can be configured to implement one or more techniques described herein for performing an automated calibration test and/or a recalibration of a drive unit's ODS(s).

The forward panel 204 faces a forward direction of motion of the drive unit 200. The forward panel 204 includes an ODS 210 and a projector(s) 216. The ODS 210 may form a part of an obstacle detection system configured to detect obstacles (e.g., objects or items from the inventory holders 130), physical barriers, and/or other drive units 200 within the environment (e.g., workspace 170). The ODS 210 may have any suitable implementation, such as visual sensors (e.g., cameras), ranging sensors (e.g., radar, lidar), proximity sensors, and so forth. In the depicted embodiment, the ODS 210 is a stereo camera, which includes a sensor 212-1 (e.g., camera) and a sensor 212-2 (e.g., camera) separated by a baseline. The stereo camera may be an active stereo camera or a passive stereo camera.

The side panel 206 faces a direction adjacent the forward direction of motion of the drive unit 200. The side panel 206 may include one or more sensors 214 (e.g., cameras) having any suitable implementation. In the depicted embodiment, the sensor 214 is a down facing camera configured to detect fiducials (or fiducial markers) on the floor of the environment (e.g., workspace 170). Other types of sensors may be included in the drive unit 200, such as inertial sensors, navigational sensors, and so forth. For example, in embodiments where the drive unit 200 is operating in an unstructured field, the drive unit 200 may be equipped with one or more additional types of sensors for navigating through the unstructured field and may not be equipped with a sensor, such as sensor 214, for detecting fiducials. In some embodiments, the drive unit 200 may include sensors with different positions and/or orientations.

The controller 220 can receive sensor signals from the ODS 210 and/or the sensor 214 and perform processing on the sensor signals. For example, the computer processor(s) of the controller 220 may perform image processing on the sensor signals (e.g., images) received from the ODS 210 to detect obstacles, physical barriers, etc. In one embodiment, the controller 220 may generate a depth map (based on the sensor signals received from the ODS 210) indicating the range (or distance) to various objects in the scene (e.g., the FOV of the ODS 210). In other embodiments, the controller 220 may transmit the sensor signals to another computing system (e.g., control system 110) to generate the depth map.

Additionally or alternatively, the computer processor(s) of the controller 220 can perform navigation control based on the sensor signals (e.g., images) received from the sensor 214. As noted above, the workspace 170 associated with the inventory system 100 may include a number of fiducial markers distributed to cover all or a portion of the workspace 170. In such embodiments, the sensor 214 can detect fiducial markers within the sensor's FOV (e.g., on the floor of the workspace 170). The controller 220 may determine location information that includes a position and orientation of the drive unit 200, via processing an image captured by the sensor 214 encompassing one or more of the fiducial markers. As a result, the controller 220 can maintain an accurate indication of the location and orientation of the drive unit 200 to aid in navigation when moving the drive unit 120 within the workspace 170. In other embodiments, the controller 220 may transmit the sensor signals from the sensor 214 to another computing system (e.g., control system 110) to determine location information of the drive unit 200. In this embodiment, the other computing system may transmit navigational commands to the drive unit 200, based on the location information.

The controller 220 can generate one or more control signals for the drive system 240 to actuate the drive unit 200 over the floor of the environment. The one or more control signals for the drive system 240 can be based on at least one of the sensor signals from the ODS 210 or the sensor signals from the sensor 214. In some embodiments, the controller 220 can further receive sensor signals from a navigational sensor (which may be implemented in the drive unit 200 or in an external computing device) and the one or more control signals for the drive system 240 may be further based on the sensor signals from the navigational sensor.

The drive system 240 can include a powertrain (e.g., electric motor(s) and drivetrain components) (not shown) and wheels 270-1, 270-2. Although not shown in FIG. 2B, the drive unit 200 may include additional wheels that are axially aligned with the wheels 270-1, 270-2. In some embodiments, the drive unit 200 uses differential steering to turn the drive unit 200 without turning the wheels 270-1, 270-2. For example, the drive unit 200 may be able to perform neutral turns by rotating, within a pair of axially-aligned wheels, one wheel in a forward direction and the other wheel in a reverse direction. Further, in some embodiments, the drive unit 200 may include one or more stabilizer wheels that are not driven by the drive system 240.

Although not shown in FIG. 2, the drive unit 200 may include one or more indicator lights (e.g., within the forward panel 204). The controller 220 can selectively illuminate the indicator light(s) of the forward panel 204, as well as any other indicator lights of the drive unit 200. The indicator light(s) may be configured to convey any suitable information to human operators collocated within the environment. For example, the controller 220 may operate the indicator light(s) to indicate that the drive unit 200 is moving, a direction that the drive unit 200 is moving, how fast the drive unit 200 is moving, whether the drive unit 200 is engaged with an inventory holder, whether the drive unit 200 detects an obstacle, a physical barrier, and/or a fiducial marker, and so forth. Further, the controller 220 may illuminate the indicator light(s) in any manner suitable to convey the different information. For example, the controller 220 may control the colors displayed by the indicator light(s) 216, illumination patterns, and so forth.

The projector(s) 216 (also referred to as an illuminator or dot projector) is generally a structured light source that is configured to project (or emit) structured light onto the scene. The projector(s) 216 can project the light in a predetermined pattern (e.g., dots, grids, horizontal bars, etc.) onto the scene. In embodiments where the ODS 210 is an active stereo camera, the controller 220 can use the projector(s) 216 to project the pattern(s) onto the scene in order to determine depth and surface information of the objects in the scene.

In embodiments herein, the controller 220 is configured to implement or more techniques for performing an automated calibration test and/or automated recalibration of the ODS 210. For example, the controller 220 can generate control signals to transition (e.g., move) the drive unit 200 to a calibration region 160 within the environment (e.g., workspace 170). The controller 220 may perform the calibration test and/or recalibration of the ODS 210 at the calibration region 160. In embodiments where the environment is a structured environment, the controller 220 may navigate to the calibration region 160 using the fiducial markers placed on the floor of the environment. Once at the calibration region 160, the controller 220 may use a fiducial marker within the calibration region 160 to align the drive unit with respect to one or more targets of a calibration apparatus within the calibration region 160. For example, the controller 220 may adjust at least one of a position or orientation of the drive unit relative to a position or orientation of the fiducial maker within the calibration region 160, in order to align the drive unit with respect to the calibration apparatus within the calibration region 160.

The controller 220 may perform the calibration test using the ODS 210 and the calibration apparatus. Based on the result of the calibration test (e.g., the calibration test fails), the controller 220 may automatically perform a recalibration of the ODS 210 at the calibration region 160, e.g., using the calibration apparatus. The drive unit 200 may be configured to travel to the calibration region 160 based on detecting a predetermined condition. The predetermined condition, for example, can include a periodic time interval (e.g., X hours since last calibration, once per day, twice per week, etc.), an instruction (e.g., from control system 110), an event (e.g., collision), etc. Note that while FIGS. 2A and 2B illustrate a particular embodiment of the drive unit 200 containing certain components and configured to operate in a particular manner, the drive unit 200 may represent any appropriate component and/or collection of components.

Figure 3A:
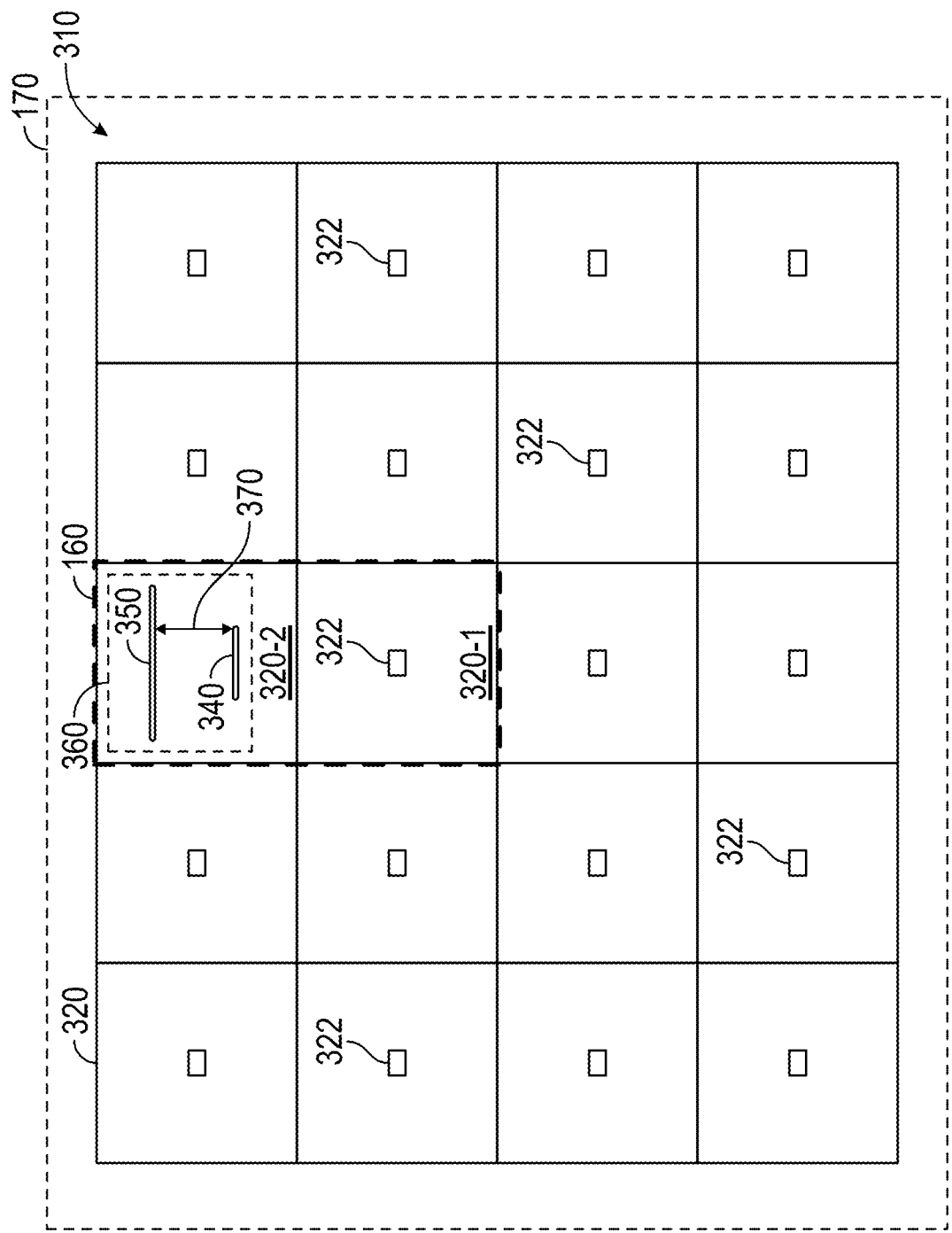
FIG. 3A illustrates a top view of a calibration region, according to one embodiment.
Figure 3B:
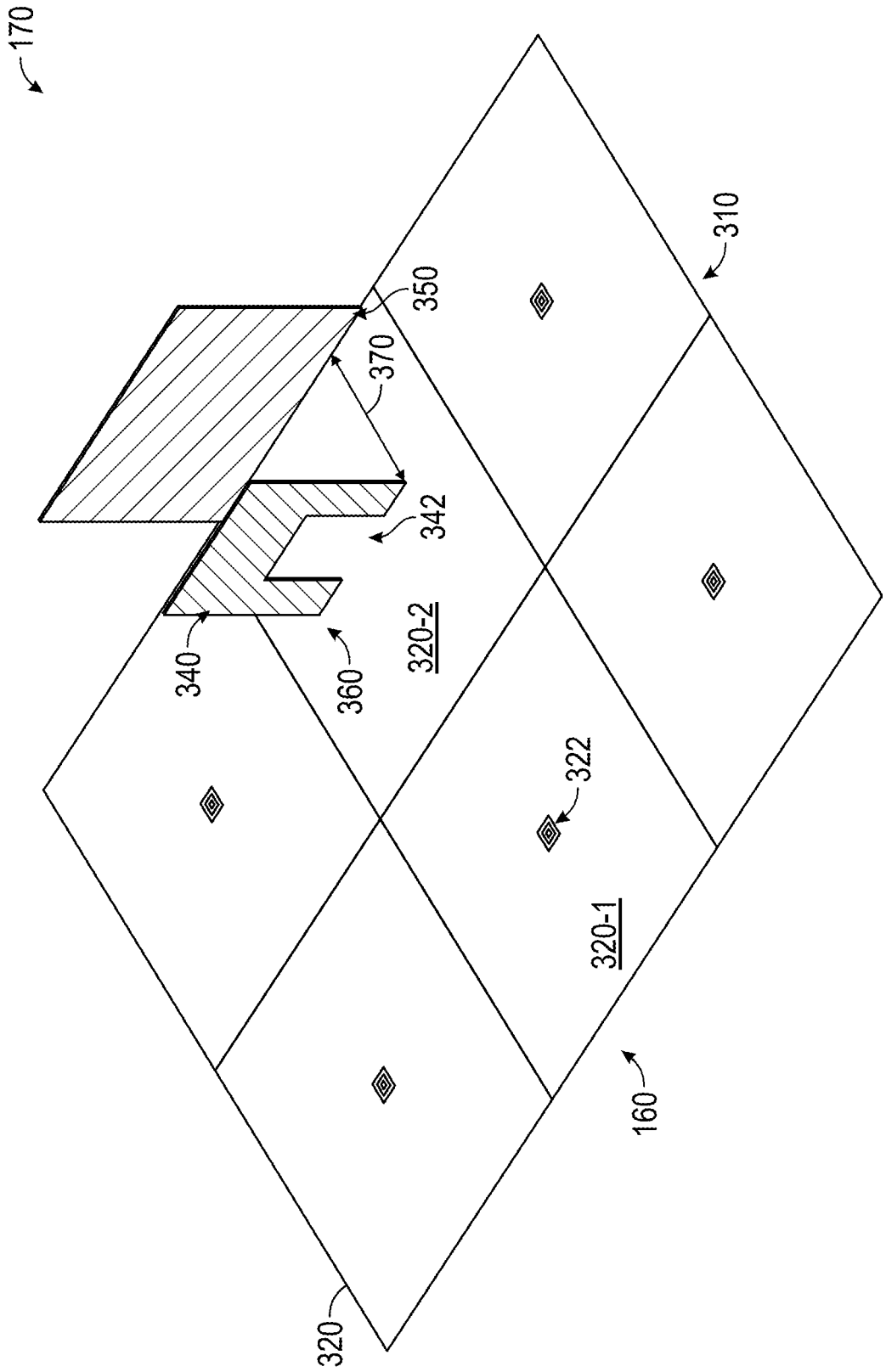
FIG. 3B illustrates a perspective view of a calibration region, according to one embodiment.
Figure 3C:
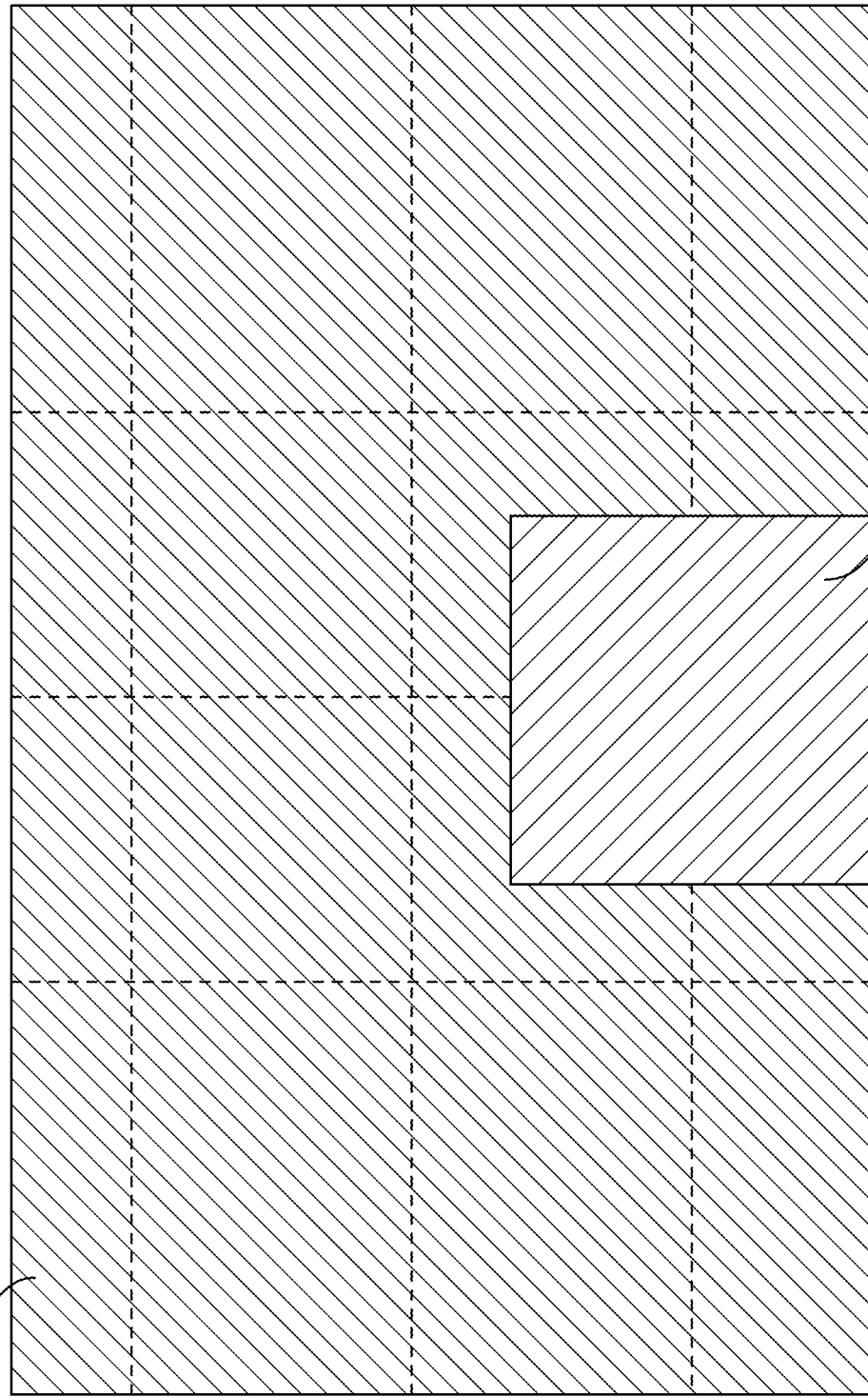
FIG. 3C illustrates a front view of a calibration region, according to one embodiment.

FIG. 3A illustrates a top view of an example calibration region 160 within an environment, FIG. 3B illustrates a perspective view of the calibration region 160 within the environment, and FIG. 3C illustrates a front view of the calibration region 160 within the environment, according to one embodiment. As shown in this embodiment, the calibration region 160 is located within a structured field 310 of a workspace 170. The structured field 310 includes a grid of multiple cells 320 (also referred to herein as cell locations), each having a predefined set of dimensions. Each cell 320 may include a fiducial marker 322 (e.g., placed on the floor), which provides navigational references for the drive unit 120. While the structured field 310 is depicted as a grid of "square" cells, note that the structured field 310 can have another arrangement of cells. In general, each cell 320 can have other dimensions and/or a different geometry.

The calibration region 160 may be located in a predefined area (or location) within the environment. Here, for example, the calibration region 160 is located within the structured field 310. In some embodiments, the structured field 310 may be externally bounded to prevent or limit access by human operator(s). As shown, the calibration region 160 is defined over two adjacent cells 320-1, 320-2. The cell 320-1 of the calibration region 160 includes a fiducial marker 322, which can be used to align the drive unit 120 with respect to the cell 320-2 of the calibration region 160. As used herein, the fiducial marker 322 within cell 320-1 of the calibration region 160 may be referred to as a "calibration fiducial" or "calibration fiducial marker." Similarly, the cell 320-1 of the calibration region 160 may be referred to as a "calibration cell."

The cell 320-2 of the calibration region 160 includes a calibration apparatus 360 (also referred to as a calibration garage or calibration fixture), which the drive unit 120 can use to perform a calibration test and/or recalibration procedure. Here, the calibration apparatus 360 includes a (calibration) target 340 and a (calibration) target 350. The targets 340 and 350 are vertical planar structures (or fixtures), which may be formed of any suitable materials (e.g., metal, plastic, wood, etc.). In this embodiment, the targets 340 and 350 are textured with different patterns as shown in FIG. 3C (e.g., for passive stereo cameras). In other embodiments, the targets 340 and 350 may be untextured (e.g., for active stereo cameras). In embodiments where the targets 340 and 350 are untextured, the drive unit 120 can use a projector (e.g., projector 216) to project a structured light pattern onto the targets 340, 350.

Note that while the calibration apparatus 360 is depicted in FIGS. 3A-3B with two targets 340, 350, in other embodiments the calibration apparatus 360 may have a different configuration and/or form factor. In general, the calibration apparatus 360 can have any suitable configuration and/or form factor consistent with the functionality described herein for enabling a drive unit to perform an automated calibration test and/or recalibration of the drive unit's ODS(s).

In one embodiment, the drive unit 120 may approach the calibration region 160 and use the calibration fiducial (e.g., via its down facing sensor 214) to align itself within the cell 320-1 (e.g., adjust a position and/or orientation of the drive unit 120 relative to a position and/or orientation of the calibration fiducial). The drive unit 120 may align itself within the cell 320-1, such that the drive unit 120 is forward facing with respect to the cell 320-2 and the calibration apparatus 360 (within the cell 320-2) is within the FOV of the ODS (e.g., ODS 210) of the drive unit 120. In some embodiments, the drive unit 120 may determine (via the (down facing) sensor 214) its positional and/or angular error relative to the calibration fiducial, and may adjust (via controller 220) its position relative to the calibration fiducial, based on the positional and/or angular error information.

In one embodiment, the drive unit 120 may continually adjust its position and/or orientation until its positional and/or angular error relative to the calibration fiducial is below predetermined threshold(s). In another embodiment, the drive unit 120 may determine (via the (down facing) sensor 214) its positional and/or angular error relative to the calibration fiducial, and may perform the calibration test based in part on the error information. For example, the drive unit 120 may use the error information to compensate (or adjust) the values of one or more depth metrics using the calibration apparatus 360.

As described below, the target 340 may be located at a first distance from the drive unit 120, when the drive unit is aligned over the calibration fiducial within the cell 320-1. Similarly, the target 350 may be located at a second distance (greater than the first distance) from the drive unit 120, when the drive unit is aligned over the calibration fiducial within the cell 320-1. The target 340 may be located a fixed (or relative) distance 370 from the target 350 within the cell 320-2.

In some embodiments, the targets 340 and 350 may be configured within the cell 320-2, such that the targets 340 and 350 are presented at different distances to the drive unit's ODS within the same scene (e.g., within the ODS's FOV). As shown in FIGS. 3B and 3C, for example, the target 340 includes a window portion 342 cut out (or removed) from the target 340. The window portion 342 may allow the ODS to have visibility to at least a portion of the target 350 through the window portion 342. As described below, by having multiple targets at different distances presented to the drive unit within the same scene, embodiments can enable the drive unit to perform a calibration test involving one or more different depth metrics (e.g., fill ratio, depth accuracy, etc.).

In some embodiments, the target 340 and/or the target 350 may have a configuration (e.g., size, position, dimensions, texture, cutout portion(s), etc.) that allows the drive unit 120 to fill the entire FOV of the ODS with the target 340 and the portion of target 350 visible through the window portion 342 of target 340. By filling the entire FOV of the ODS with the target 340 and the portion of target 350 visible through the window portion 342, the drive unit 120 can determine (e.g., compute) the fill ratio of the ODS. Additionally, the target 340 and/or target 350 may have a configuration (e.g., size, position, dimensions, texture, etc.) that allows the drive unit 120 to determine a depth accuracy of the ODS.

Note that FIGS. 3A-3C illustrate a reference example environment that may include a calibration region 160 and that the calibration region 160 may be used in other environments. In some embodiments, for example, the calibration region 160 may be located in an unstructured field that does not have fiducial markers placed on the floor of the environment and/or is not externally bounded.

Figure 4:
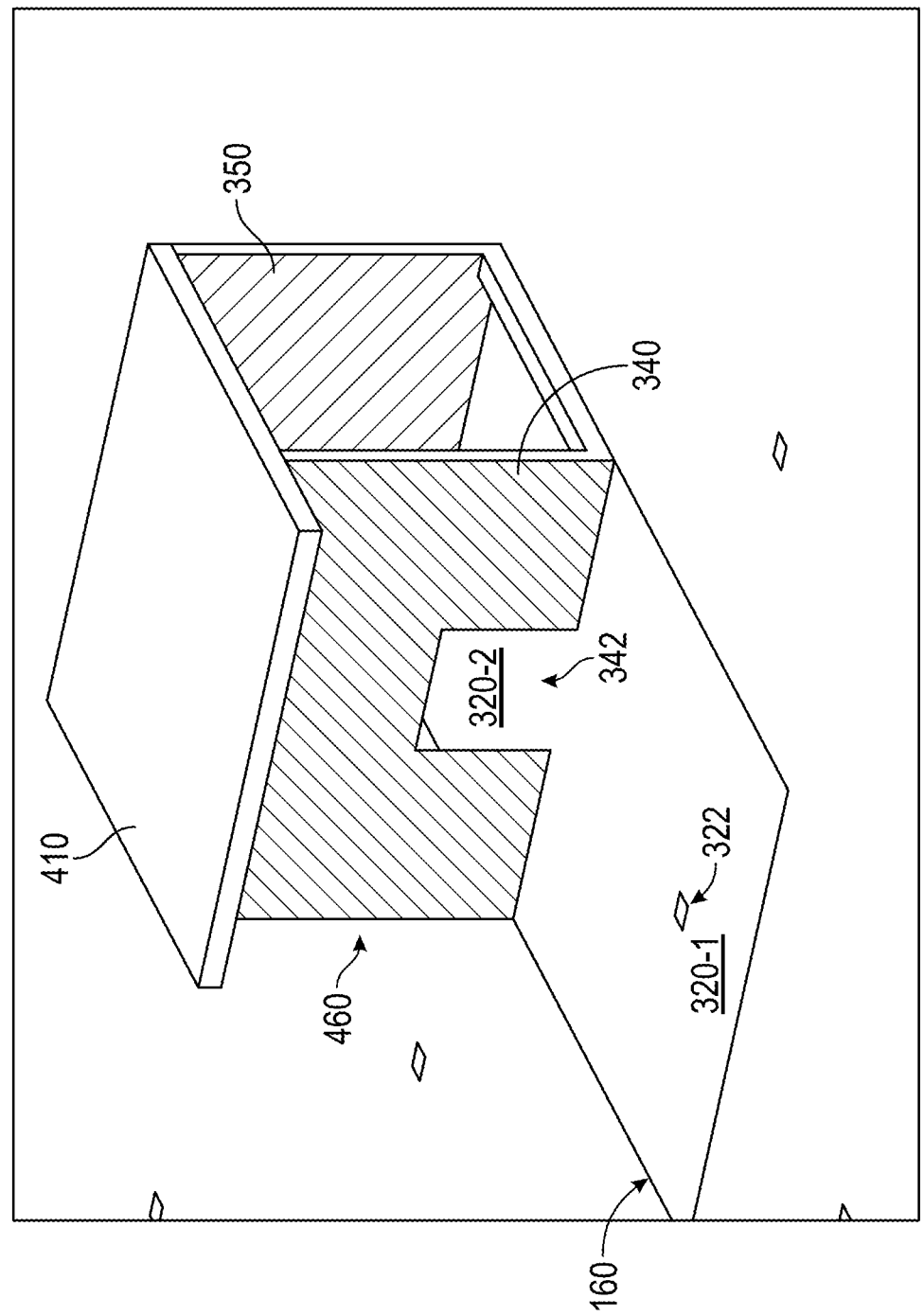
FIG. 4 illustrates a perspective view of another calibration region, according to one embodiment.

Additionally, note that FIGS. 3A-3C illustrate a reference example configuration of the calibration region 160 and that the calibration region 160 can have other configurations. For example, FIG. 4 illustrates another calibration region 160 that can be used within an environment (e.g., structured or unstructured field), according to one embodiment. Compared to the calibration region 160 depicted in FIGS. 3A-3C, the calibration region 160 illustrated in FIG. 4 includes a calibration apparatus 460 within the cell 320-2. The calibration apparatus 460 includes a light diffuser 410, which is disposed on the top surfaces of the targets 340 and 350, and extends beyond the top surface of the target 340. The light diffuser 410 is generally configured to reduce glare on the targets 340, 350 (e.g., from ambient lighting) and to provide light uniformity across the targets 340, 350. The light diffuser 410 may be formed from any suitable materials, including, e.g., plastic, paper, glass, fabric, etc. While FIG. 4 depicts the calibration apparatus 460 within a structured field, in other embodiments the calibration apparatus 460 may be located within an unstructured field.

Figure 5A:
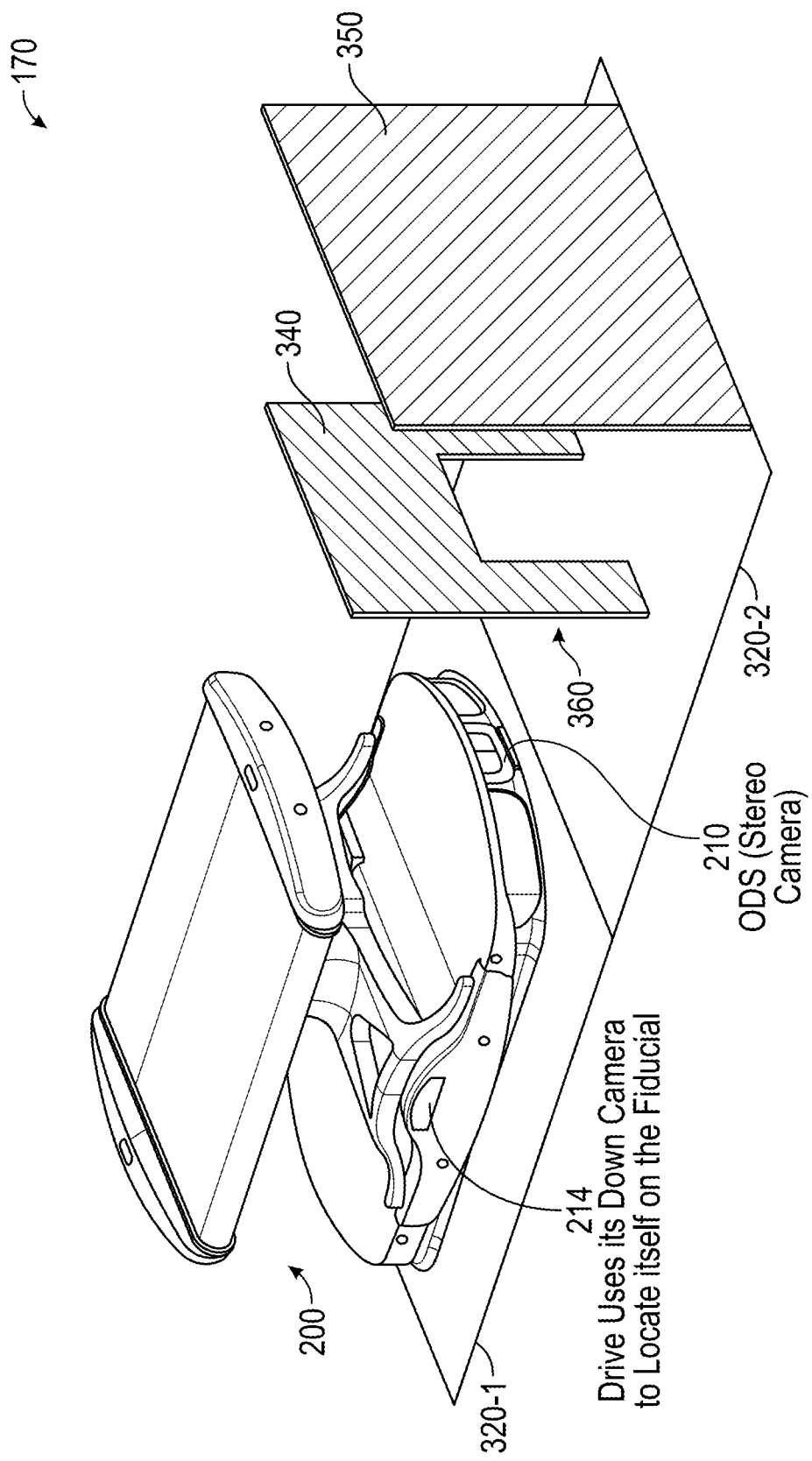
FIG. 5A illustrates a perspective view of a drive unit within a calibration region, according to one embodiment.
Figure 5B:
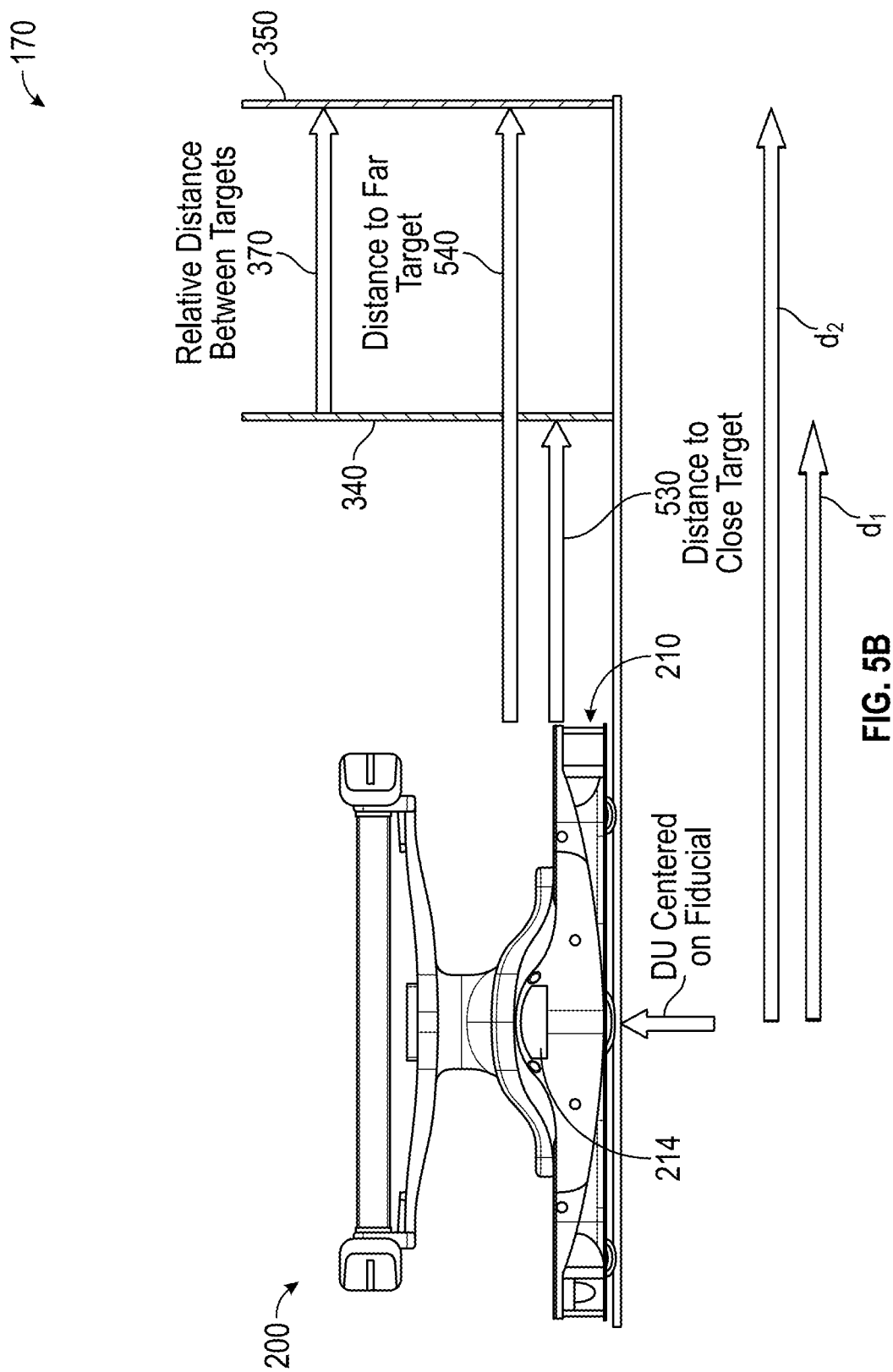
FIG. 5B illustrates a side view of a drive unit within a calibration region, according to one embodiment.
Figure 6:
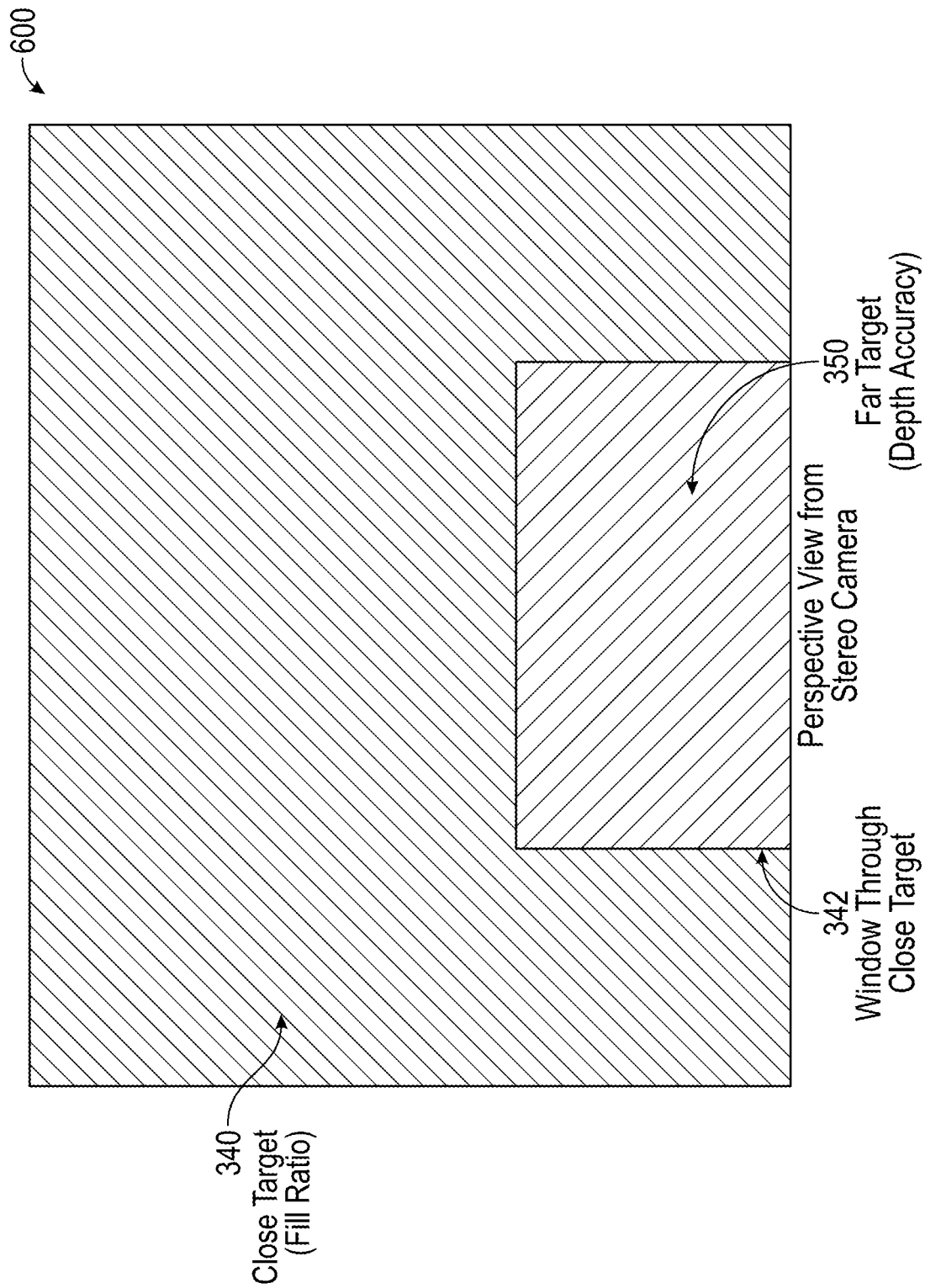
FIG. 6 illustrates a field-of-view of a drive unit within an environment, according to one embodiment.

FIG. 5A illustrates a perspective view of a drive unit 200 within a calibration region 160 and FIG. 5B illustrates a side view of a drive unit 200 within a calibration region 160, according to one embodiment. Here, as noted above, the drive unit 200 (which is one example embodiment of the drive unit 120) can use the calibration fiducial within the cell 320-1 to align itself with respect to the calibration apparatus 360 within cell 320-2. For example, the target 340 may be a first predetermined distance ($d_1$) away from the calibration fiducial, and the target 350 may be a second predetermined distance ($d_2$) away from the calibration fiducial, where $d_2 > d_1$. Additionally, the ODS 210 of the drive unit 200 may be offset from the sensor 214 of the drive unit. Thus, when the sensor 214 of the drive unit 200 is aligned over the calibration fiducial, the ODS 210 (e.g., stereo camera) may be a distance 530 away from target 340 and a distance 540 away from target 350. In one particular embodiment, the distance 530 may be approximately 300 millimeters (mm) and the distance 540 may be approximately 1000 mm, assuming a 1000 mm×1000 mm cell. Note, however, that these are merely reference examples of the distances for the targets 340, 350, and that other distances can be configured for the targets 340, 350. FIG. 6 illustrates an example FOV 600 of the ODS (e.g., stereo camera) of the drive unit 200, according to one embodiment. In particular, the FOV 600 is the FOV of the ODS when it is aligned (e.g., in cell 320-1) in front of the calibration apparatus 360 that is within cell 320-2.

In some cases, the measurement accuracy of the calibration test performed using the targets 340, 350 of the calibration apparatus 360 may be based on the drive unit's ability to align itself within the cell 320-1 using the calibration fiducial. For example, while the calibration test may be based on an assumption that the distances 530 and 540 are at predefined values, in some cases, there may be one or more tolerances associated with the drive unit's position and/or orientation within the cell 320-1. For instance, there may be a tolerance associated with the drive unit's ability to locate a target based on the calibration fiducial, a tolerance associated with the location of the sensor 214 within the drive unit 200, a tolerance associated with the drive unit's ability to detect its positioning error from the calibration fiducial, etc. Because of one or more of these tolerances, there may be scenarios in which the calibration test is performed assuming the drive unit's ODS 210 is X mm away from the target 340 and Y mm away from the target 350, where the drive unit's ODS 210 is instead X±C away from the target 340 and Y±C away from the target 350, where C<X<Y.

In some embodiments, the drive unit 200 can be configured to perform at least a portion of the calibration test using the relative distance 370 between the targets 340 and 350 to account for any misalignment (or positioning error) of the drive unit 200 with respect to the targets 340, 350. For example, in one embodiment, the drive unit 200 may use the relative distance 370 between the targets 340 and 350 as part of the depth accuracy measurement. Because the relative distance 370 may be maintained in instances where there is misalignment of the drive unit 200, using the relative distance 370 (as opposed to the distance 540) for the depth accuracy metric can result in a smaller measurement error.

Figure 7:
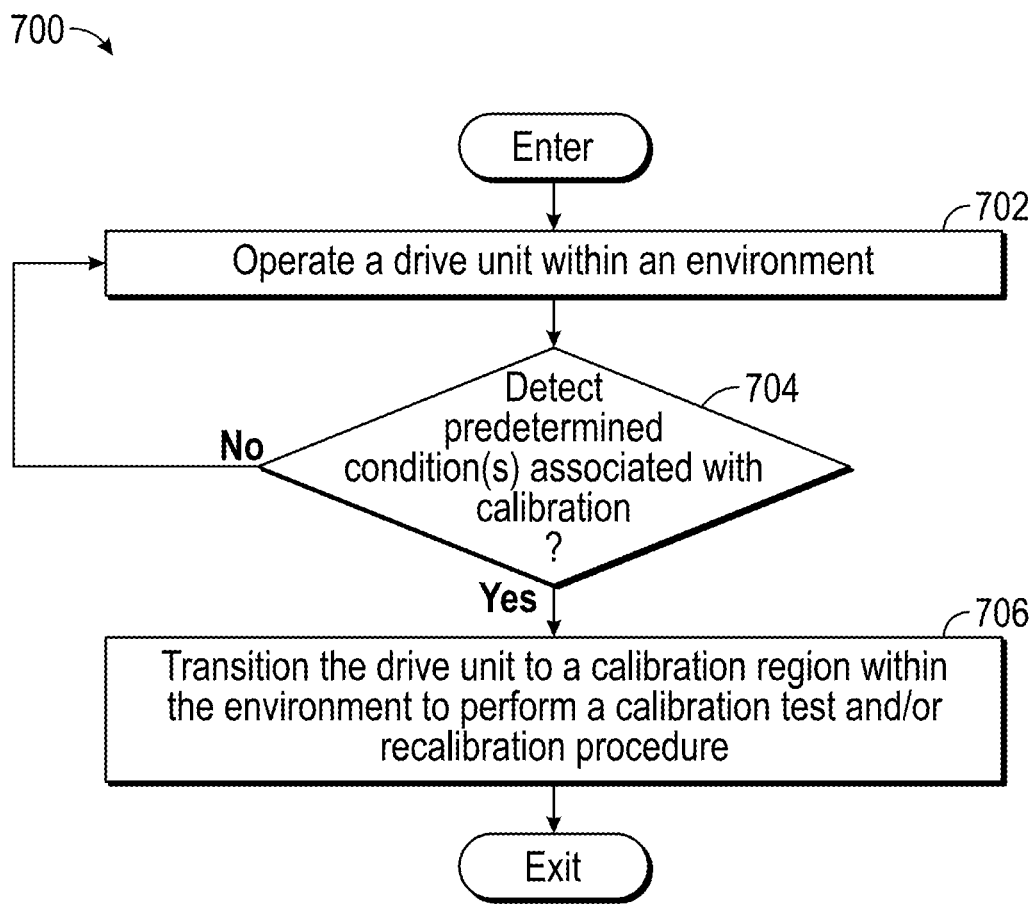
FIG. 7 is a flowchart of a method for controlling a drive unit within an environment, according to one embodiment.

FIG. 7 is a flowchart of a method 700 for controlling a drive unit (e.g., drive unit 120, drive unit 200, etc.) within an environment (e.g., workspace 170), according to one embodiment. The method 700 may be performed by a controller (e.g., control system 110, controller 220, etc.).

Method 700 may enter at block 702, where the controller operates a drive unit within the environment. For example, the controller may operate the drive unit to transport one or more inventory holders (e.g., inventory holders 130) across the environment. In one embodiment, the environment is a structured environment (e.g., structured field 310). In another embodiment, the environment is an unstructured environment.

At block 704, the controller determines whether one or more predetermined conditions associated with calibration of the drive unit's sensors (e.g., ODS 210, such as a stereo camera) have been detected. As noted, the predetermined condition(s) can include at least one of a predetermined time instance (or time interval), an event, an instruction (or command), etc. In one particular embodiment, the predetermined condition includes an elapsed predefined amount of time since a previous (or prior) calibration of the drive unit's sensors and/or an elapsed predefined amount of time since a previous (or prior) calibration test of the drive unit's sensors. If the predetermined condition(s) are not detected, then the method 700 proceeds to block 702.

On the other hand, if a predetermined condition(s) is detected at block 704, then the controller transitions the drive unit to a calibration region (e.g., calibration region 160) within the environment to perform a calibration test and/or a recalibration procedure. In one embodiment, the controller may generate one or more commands to instruct the drive unit to transition (or move or approach) the calibration region. In some embodiments, the method 700 may further include performing the recalibration procedure at the calibration region upon determining that the calibration test has failed. The method 700 may then exit.

Figure 8:
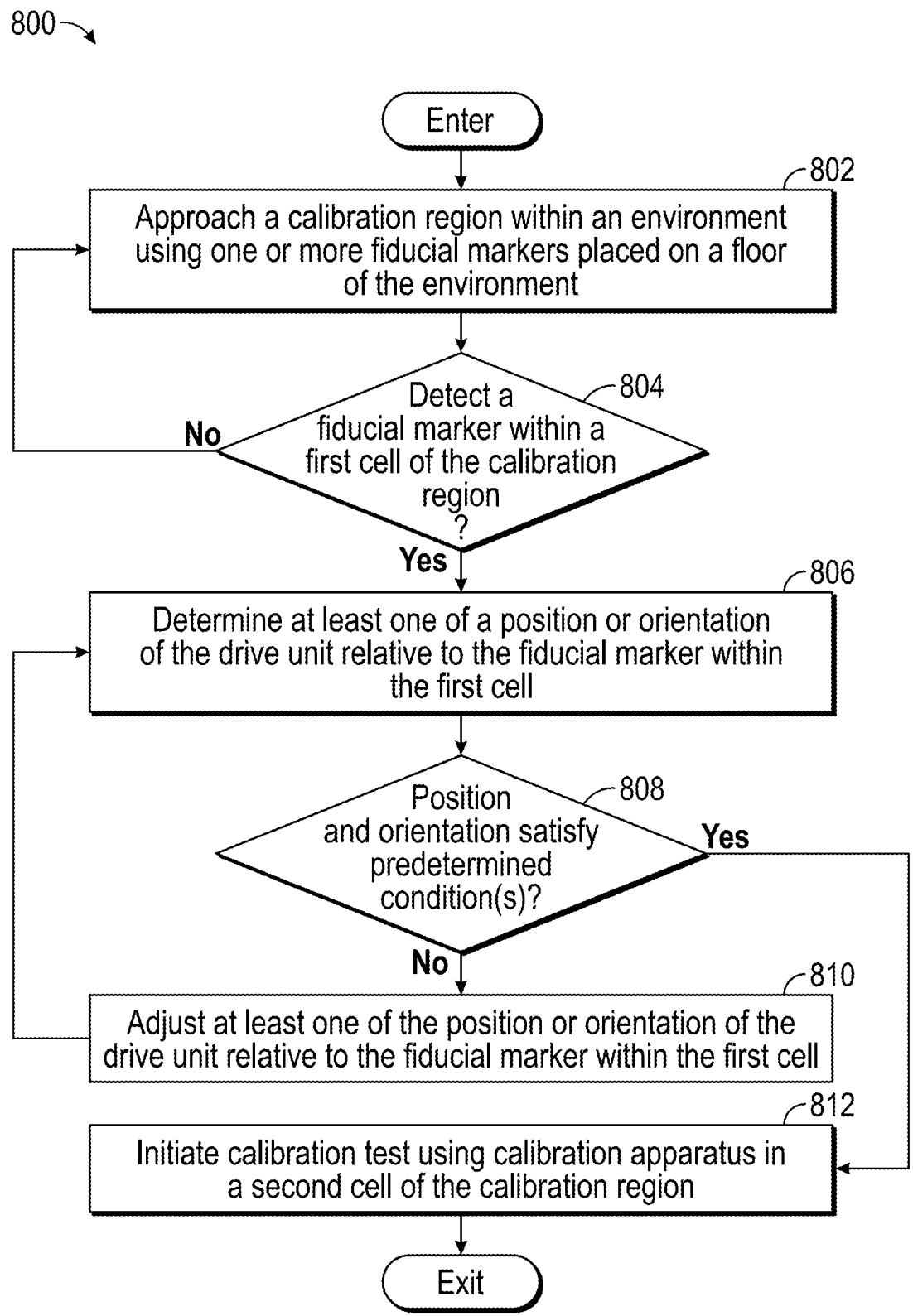
FIG. 8 is a flowchart of a method for transitioning to a calibration region within an environment, according to one embodiment.

FIG. 8 is a flowchart of a method 800 for transitioning a drive unit (e.g., drive unit 120, drive unit 200, etc.) to a calibration region (e.g., calibration region 160) within an environment (e.g., workspace 170), according to one embodiment. The method 800 may be performed by a controller (e.g., control system 110, controller 220, etc.).

Method 800 may enter at block 802, where the controller instructs the drive unit to approach the calibration region within the environment using one or more fiducial markers (e.g., fiducial markers 322) placed on a floor of the environment. At block 804, the controller determines whether a fiducial marker (e.g., fiducial marker 322) within a first cell (e.g., cell 320-1) of the calibration region is detected. For example, the controller may obtain sensor signals (e.g., images) detected via a down facing sensor (e.g., sensor 214) on the drive unit, and may determine a location (along with a position and/or orientation) of the drive unit based on the sensor signals. In one particular embodiment, the controller may determine whether the drive unit is located within the first cell, based on whether an image captured by the down facing sensor includes the fiducial marker within the first cell.

If the fiducial marker within the first cell is not detected, then the controller continues to control the drive unit to approach the calibration region (block 802). On the other hand, if the fiducial marker within the first cell is detected, then the controller determines at least one of a position or orientation of the drive unit relative to the fiducial marker within the first cell (block 806). For example, the controller may determine the position and/or orientation of the drive unit, based on the sensor signals (e.g., images) received from the down facing sensor.

At block 808, the controller determines whether the position and orientation satisfy one or more predetermined conditions. In one embodiment, the controller can determine whether the position of the drive unit (relative to the fiducial marker within the first cell) is within a first threshold (e.g., within a first tolerance) and/or can determine whether the orientation (e.g., horizontal angle) of the drive unit (relative to the fiducial marker within the first cell) is within a second threshold (e.g., within a second tolerance). That is, the controller can determine whether a difference between the position of the drive unit and the position of the fiducial marker is less than the first threshold and/or determine whether a difference between the orientation of the drive unit and the orientation of the fiducial marker is less than the second threshold.

In some embodiments, the controller may determine whether the position and orientation satisfy the predetermined conditions, based on sensor signals received from the down facing sensor. For example, the down facing sensor may indicate the positional and/or angular error relative to the (position and/or horizontal angle of the) fiducial marker within the first cell. In this case, the controller can determine whether the position and/or orientation are within the first and second thresholds, based on the information from the down facing sensor.

If the position and/or orientation do not satisfy the predetermined conditions (e.g., the difference between the position of the drive unit and the position of the fiducial marker is greater than the first threshold and/or the difference between the orientation of the drive unit and the orientation of the fiducial marker is greater than the second threshold), then the controller adjusts at least one of the position or orientation of the drive unit relative to the fiducial marker within the first cell (block 810). In one embodiment, the controller (at block 810) may use the information from the down facing sensor to determine the adjustment to the position and/or orientation of the drive unit. The method 800 then proceeds to block 806.

If the position and orientation do satisfy the predetermined conditions at block 808, then the controller initiates a calibration test using a calibration apparatus (e.g., calibration apparatus 360 or 460) in a second cell (e.g., cell 320-2) of the calibration region (block 812). The method 800 then exits.

Note that, in some embodiments, the controller may use the positional and/or angular error relative to the (position and/or horizontal angle of the) fiducial marker within the first cell to compensate for the calibration test performed using the calibration apparatus in the second cell. In these embodiments, the controller may initiate the calibration test (in block 812) after locating the fiducial marker within the first cell (in block 806), instead of performing the operations in blocks 808 and 810. The controller may use knowledge of the error information to adjust the values of the depth metrics calculated using the calibration apparatus within the second cell.

Figure 9:
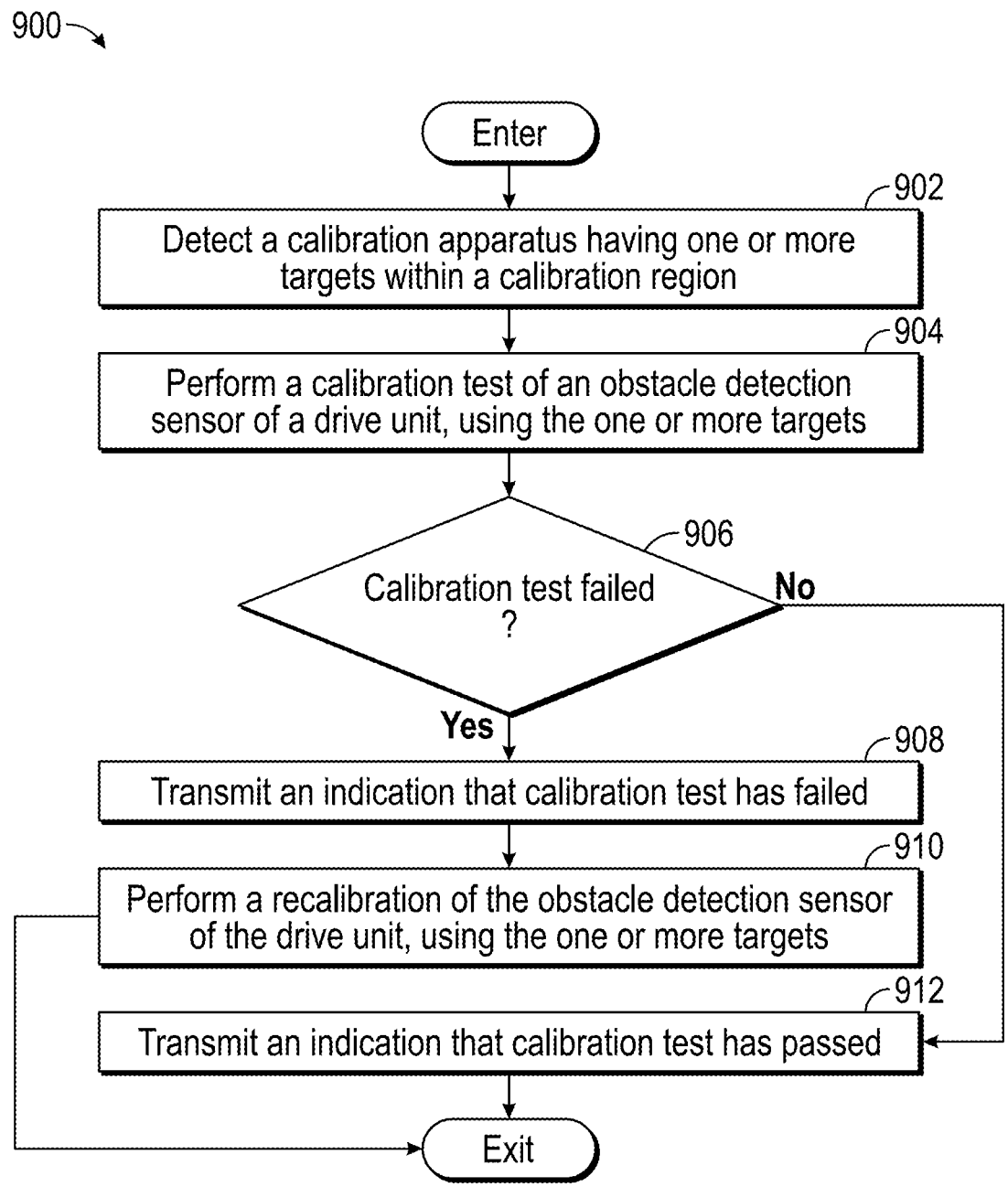
FIG. 9 is a flowchart of a method for performing a calibration test for a drive unit, according to embodiment.

FIG. 9 is a flowchart of a method for performing a calibration test for a drive unit (e.g., drive unit 120, drive unit 200, etc.), according to one embodiment. The method 900 may be performed by a controller (e.g., control system 110, controller 220, etc.).

Method 900 may enter at block 902, where the controller detects via an ODS (e.g., ODS 210) a calibration apparatus (e.g., calibration apparatus 360, calibration apparatus 460, etc.) having one or more targets (e.g., targets 340, 350) within a calibration region (e.g., calibration region 160). A front view of example targets 340, 350 within a calibration region (from the perspective of an ODS) is illustrated in FIG. 6, for example.

At block 904, the controller performs a calibration test of an ODS (e.g., ODS 210) of the drive unit, using the one or more targets. In one embodiment, the ODS is a stereo camera. In one embodiment, the calibration apparatus includes a first target (e.g., target 340) and a second target (e.g., target 350). The first and second targets can be located at different distances with respect to the drive unit. For example, the first target may be at a first distance (e.g., distance 530) away from the ODS of the drive unit, and the second target may be at a second distance (e.g., distance 540) away from the ODS of the drive unit, where the second distance is greater than the first distance.

In some embodiments, the first and second targets may be presented to the drive unit at different distances within the same scene. For example, the first target may include a window portion (e.g., window portion 342) that enables the ODS of the drive unit to have visibility to at least a portion of the second target through the window portion of the first target. As shown in FIG. 6, for example, the target 350 is visible through the window portion 342 of the target 340.

In some embodiments, the calibration test may involve determining one or more depth metrics using the one or more targets. For example, the controller may use the first target and at least a portion of the second target to determine a fill ratio associated with the ODS of the drive unit. In particular, the first target along with the portion of the second target visible through the window portion (e.g., window portion 342) of the first target can be used to fill in the entire FOV of the ODS. The controller may then determine the number (or fraction) of valid depth pixels across the entire FOV of the ODS as the fill ratio. Additionally, the controller may use the first target and/or the second target to determine a depth accuracy associated with the ODS of the drive unit. For example, the controller may compare the reported depth values from the ODS's output to actual distance(s) (e.g., a ground truth) to determine the depth accuracy of the ODS of the drive unit. For instance, the depth value from the ODS's output for the first target can be compared to the distance 530 and the depth value from the ODS's output for the second target can be compared to the distance 540. In some embodiments, the ODS's output for the differences between the first and second targets may be compared to an actual relative distance (e.g., distance 370) between the first and second targets.

At block 906, the controller determines whether the calibration test has failed. In one embodiment, the controller may determine the calibration test has failed when at least one value of at least one depth metric satisfies a predetermined condition (e.g. is below a predefined threshold associated with the depth metric). For example, if the controller determines that a value of the fill ratio is less than a predetermined threshold and/or determines that a value of the depth accuracy is less than a predetermined threshold, then the controller may determine that the calibration test has failed. If the controller determines that the value of the fill ratio and the value of the depth accuracy are greater than respective thresholds, then the controller may determine that the calibration test has passed.

When the calibration test fails (block 906), the controller transmits an indication that the calibration test has failed (block 908). In one embodiment, the controller may transmit the indication to another computing system (e.g., control system 110). At block 910, the controller performs a recalibration of the ODS of the drive unit, using the one or more targets. For example, the controller may run one or more self-calibration algorithms to recalibrate the ODS (e.g., stereo camera) using the same one or more targets.

Figure 10A:
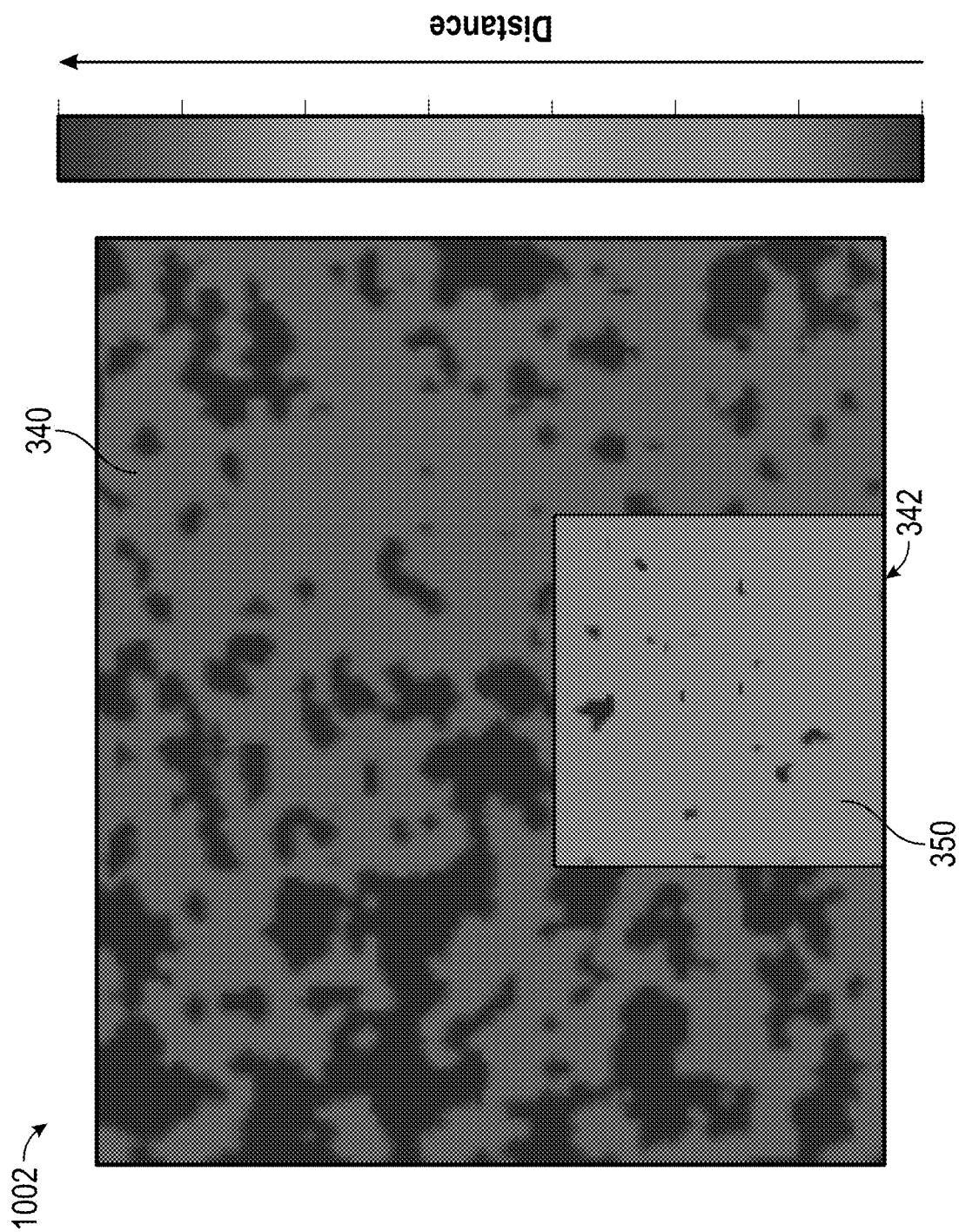
FIG. 10A illustrates a field-of-view of an ODS prior to recalibration, according to one embodiment.
Figure 10B:
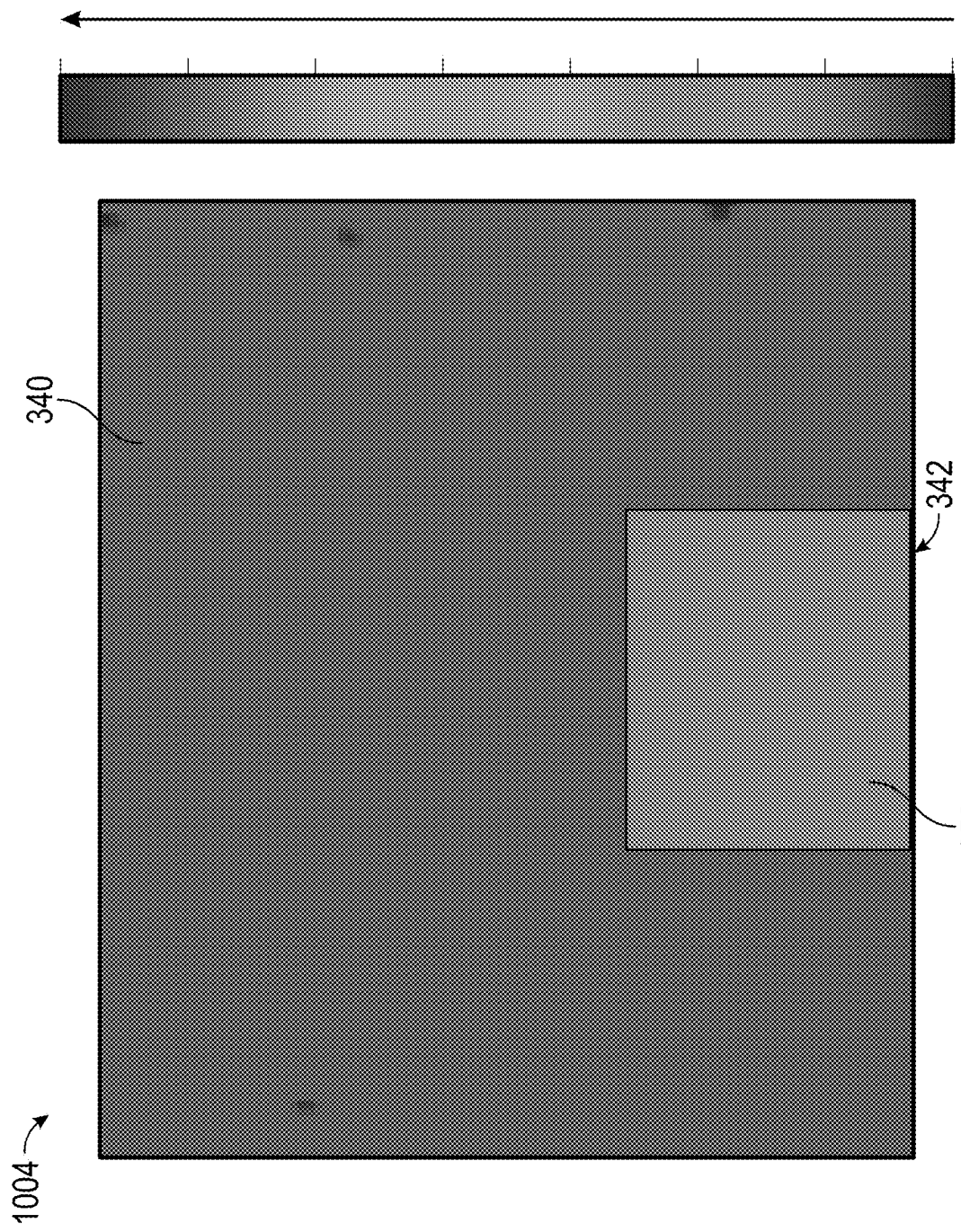
FIG. 10B illustrates a field-of-view of an ODS after recalibration, according to one embodiment.

FIG. 10A illustrates an example FOV 1002 of the drive unit's ODS prior to recalibration for the targets 340, 350 illustrated in FIG. 6, and FIG. 10B illustrates an example FOV 1004 of the drive unit's ODS after recalibration for the targets 340, 350 illustrated in FIG. 6, according to one embodiment. As shown in FIG. 10B, the fill ratio (e.g., amount of valid pixels) of the ODS is significantly improved, relative to the fill ratio associated with FIG. 10A. For example, there is a significant less amount of dark spots (e.g., indicative of invalid pixels) in the FOV 1004 than in the FOV 1002. Additionally, as shown in FIG. 10B, the depth accuracy of the ODS is improved, relative to the depth accuracy of the ODS in FIG. 10A.

Returning to FIG. 9, when the calibration test passes (block 906), the controller transmits an indication (e.g., to control system 110) that the calibration test has passed (block 912). Then method 900 may then exit. In this manner, embodiments enable a drive unit to autonomously detect sensors that may be out of calibration and calibrate sensors without human intervention.

While many of the embodiments herein describe using the calibration region 160 to perform calibration testing and/or recalibration of an ODS on a drive unit, in other embodiments the calibration region 160 can be used to perform other types of testing for the ODS. For example, in some embodiments, the calibration region 160 can be used to perform regression testing on an ODS (e.g., stereo camera) with respect to depth accuracy over multiple targets at different distances. In these embodiments, the regression testing may be performed before the ODS is disposed (or installed) on a particular drive unit (e.g., drive unit 120, drive unit 200, etc.).

Figure 11:
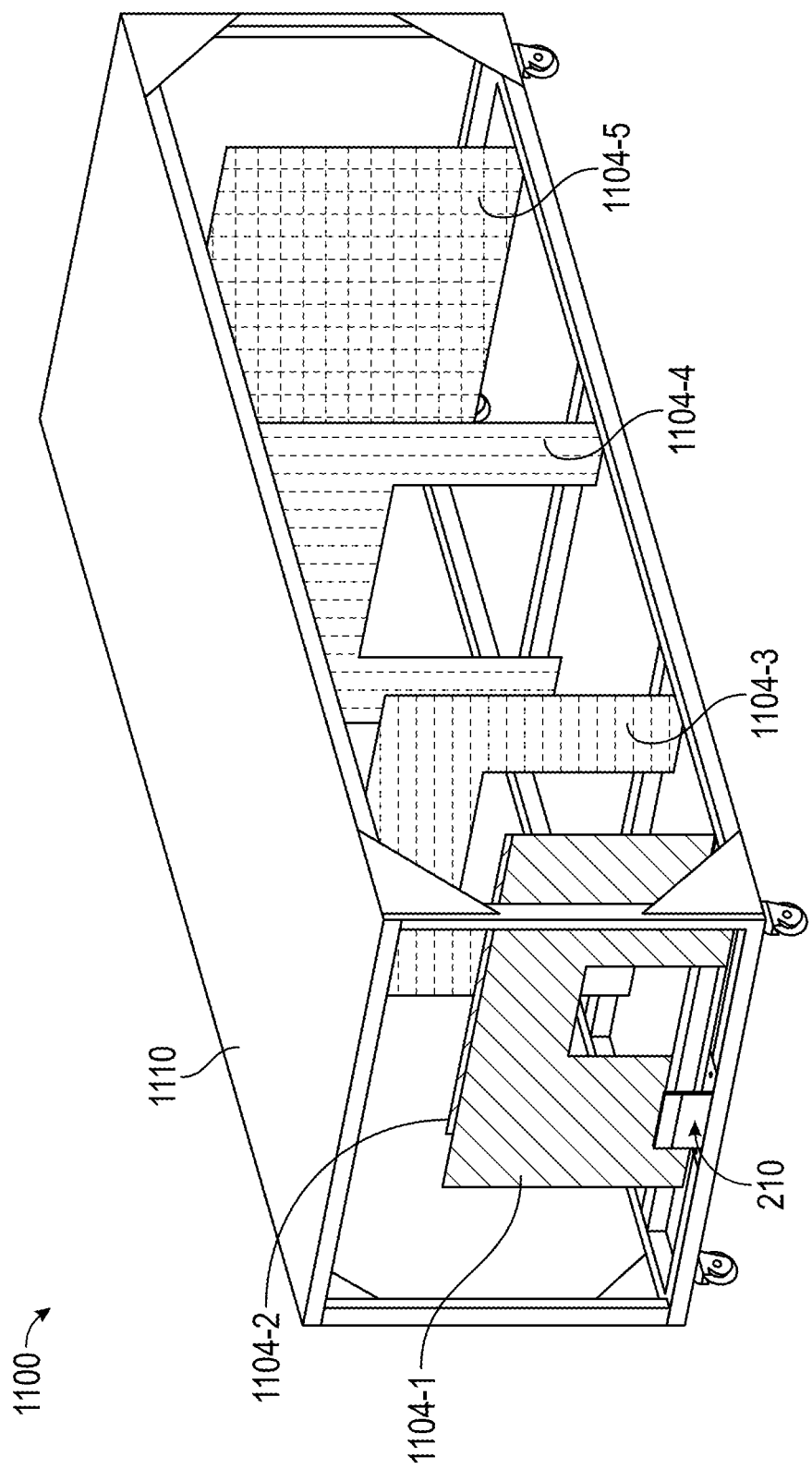
FIG. 11 illustrates an example apparatus for performing depth testing of an ODS over multiple targets, according to one embodiment.
Figure 12A:
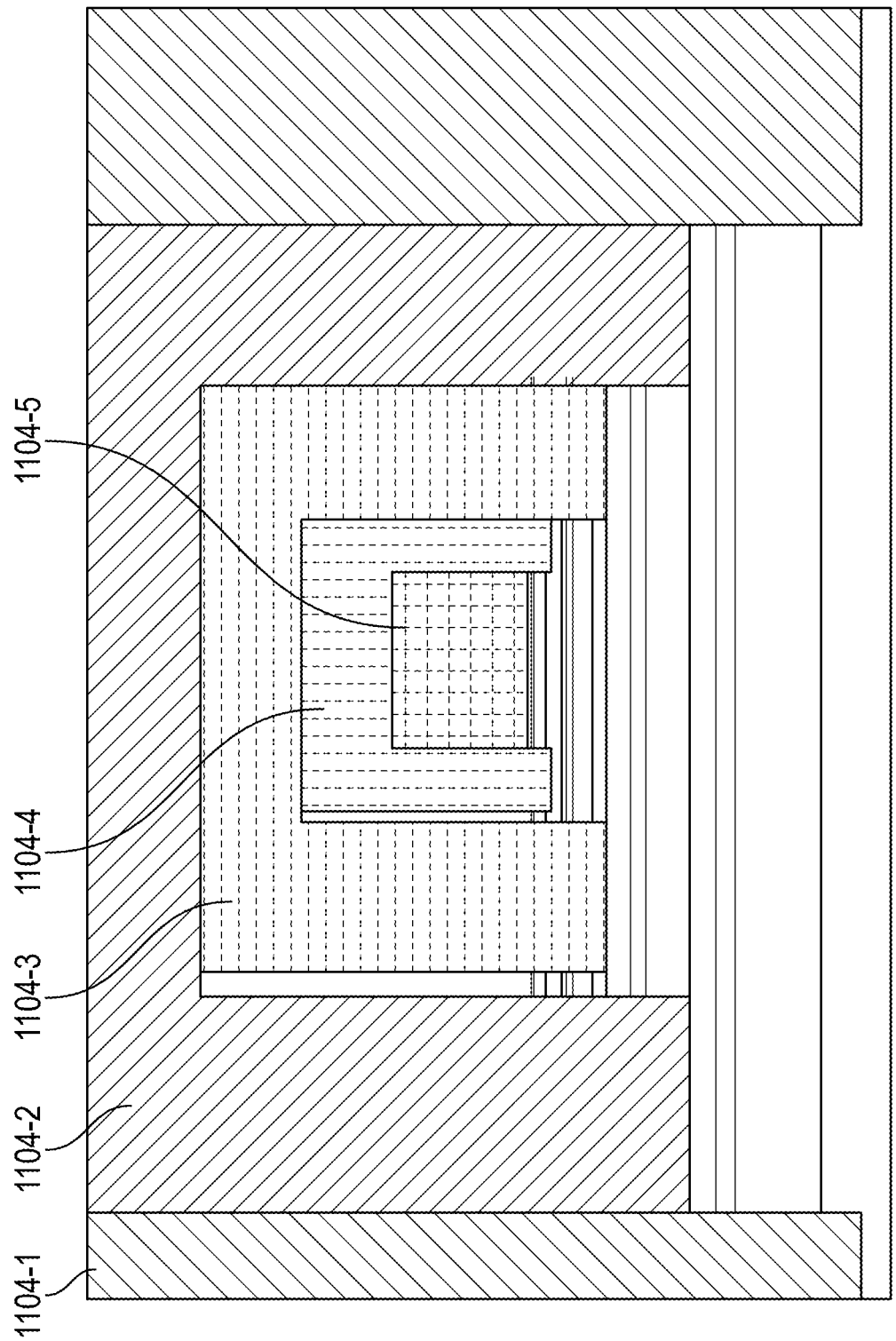
FIG. 12A illustrates a front view of multiple targets within the apparatus illustrated in FIG. 11, according to one embodiment.

FIG. 11 illustrates an example apparatus 1100 for performing regression testing of depth accuracy for an ODS, according to one embodiment. In one embodiment, the apparatus 1100 may be located within the calibration region 160 of an environment (e.g., workspace 170). The apparatus 1100 is a testing fixture and includes incrementally spaced targets 1104 1-5. That is, each target 1104 is located at a different distance from the ODS 210. FIG. 12A illustrates a front view of the targets 1104 1-5 (from the perspective of the ODS 210), according to one embodiment.

In this embodiment, each target 1104 includes a different textured pattern (e.g., the ODS 210 may be a passive stereo camera). Note, however, that in other embodiments, each target 1104 may be untextured (e.g., when the ODS 210 is an active stereo camera). The apparatus 1100 also includes a light diffuser 1110 to provide light uniformity across the multiple targets 1104 1-5. The targets 1104 may be presented to the ODS over the different distances within the same scene. As shown in FIG. 12A, for example, each target 1104 1-4 includes a window portion (cut out from the respective target) to allow visibility to at least one adjacent target at a different distance.

Figure 12B:
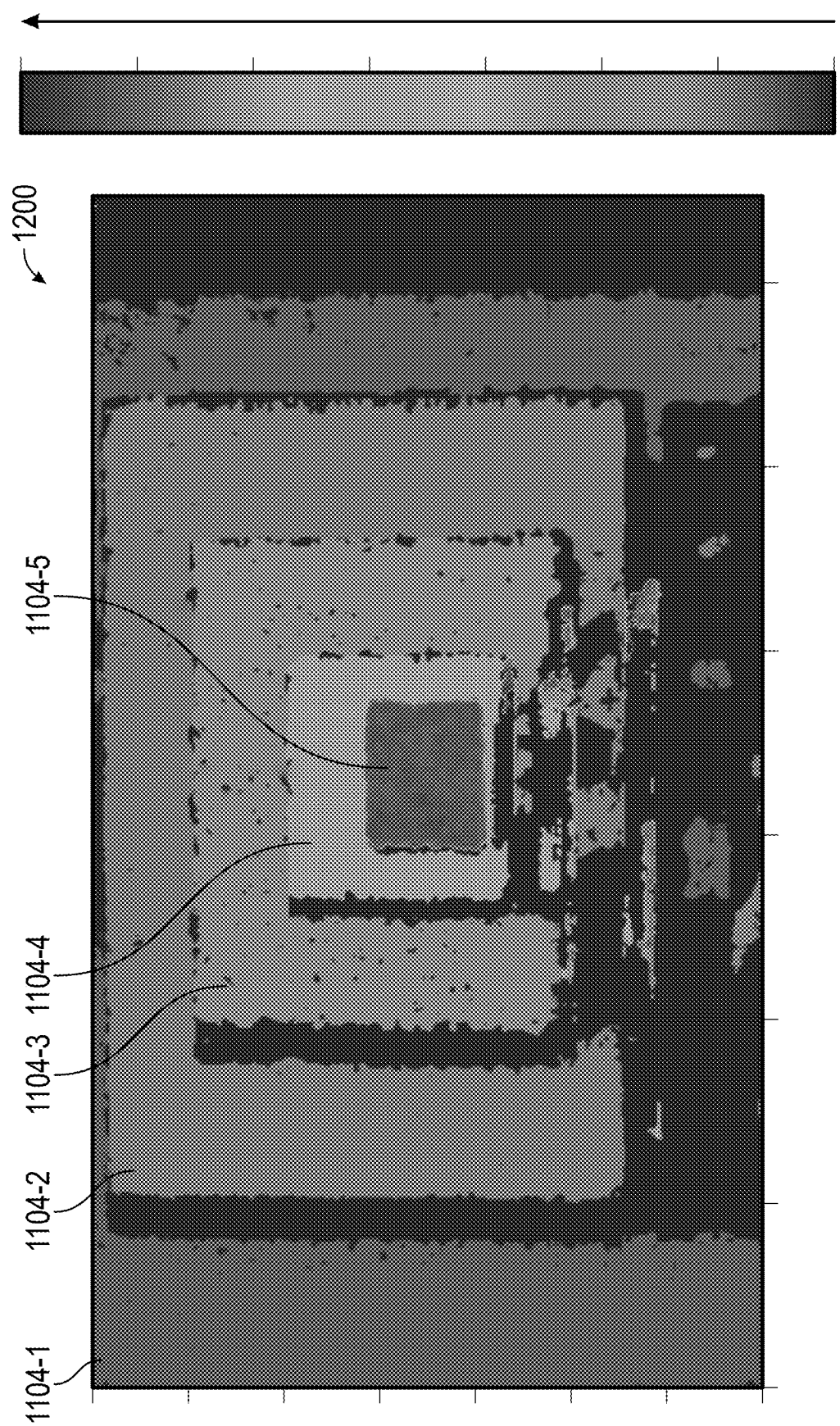
FIG. 12B illustrates a depth map for an ODS over multiple targets within the apparatus illustrated in FIG. 11, according to one embodiment.

The apparatus 1100 can allow testing of the depth accuracy of an ODS over multiple distances at the same time (within a constrained area), as opposed to testing the depth accuracy of an ODS for a single target at a time. For example, FIG. 12B illustrates a depth map of the ODS for the targets 1104 1-5 illustrated in FIG. 12A.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An inventory system comprising:
   a structured field within an environment, the structured field comprising a plurality of fiducial markers, each disposed in a different cell location on a floor of the environment;
   a calibration region disposed within the structured field, wherein the calibration region comprises;
      a first cell location comprising a plurality of calibration targets, wherein the plurality of calibration targets comprises:
         a first target at a first distance from a drive unit; and
         a second target at a second distance from the drive unit;
         wherein the second distance is greater than the first distance, and wherein the first target comprises a window portion such that the second target is viewable through the window portion; and
      a light diffuser disposed along an upper surface of the plurality of calibration targets; and
   at least one drive unit operable to autonomously move within the structured field, based on detecting one or more of the plurality of fiducial markers, wherein the at least one drive unit comprises:
      a stereo camera configured to detect one or more obstacles within the structured field; and
      a controller configured to:
         instruct the at least one drive unit to move to the calibration region upon detecting at least one predetermined condition; and
         perform a calibration test of the stereo camera at the calibration region using the plurality of calibration targets, wherein the calibration test comprises determining a fill ratio of the stereo camera based at least in part on a portion of the second target viewable through the window portion.

2. The inventory system of claim 1, wherein the controller is further configured to, upon determining that the calibration test has failed, initiate a recalibration of the stereo camera at the calibration region using the plurality of calibration targets.

3. The inventory system of claim 1, wherein:
   the calibration region further comprises a second cell location comprising a first fiducial marker of the plurality of fiducial markers; and
   the controller is configured to instruct the at least one drive unit to move to the second cell location within the calibration region, upon detecting the at least one predetermined condition.

4. The inventory system of claim 3, wherein:
   the at least one drive unit further comprises a sensor configured to detect one or more of the plurality of fiducial markers; and
   the controller is configured to:
      obtain, via the sensor, an image of the first fiducial marker within the second cell location; and
      control at least one of a position or an orientation of the at least one drive unit within the second cell location, based on the image of the first fiducial marker.

5. A system comprising:
   a calibration region disposed in an environment and comprising a calibration apparatus, wherein the calibration apparatus comprises:
      a light diffuser;

a first target at a first distance from a drive unit; and a second target at a second distance from the drive unit; wherein the second distance is greater than the first distance, and wherein the first target comprises a window portion such that the second target is viewable through the window portion; and at least one drive unit operable to autonomously move throughout the environment, wherein:

the at least one drive unit comprises a first sensor configured to detect one or more objects within the environment; and the at least one drive unit is configured to:

autonomously transition to the calibration region upon detecting at least one predetermined condition; and perform a calibration test of the first sensor at the calibration region using the calibration apparatus, wherein the calibration test comprises determining a fill ratio of the sensor based at least in part on a portion of the second target viewable through the window portion.

6. The system of claim 5, wherein the at least one drive unit is further configured to initiate, at the calibration region, a recalibration procedure to correct a calibration of the first sensor, upon determining that the calibration test has failed.

7. The system of claim 6, wherein performing the calibration test comprises determining one or more metrics indicative of a performance of the first sensor, using the calibration apparatus.

8. The system of claim 7, wherein determining that the calibration test has failed comprises determining that at least one of the one or more metrics is below a respective threshold associated with the at least one of the one or more metrics.

9. The system of claim 5, wherein the at least one predetermined condition comprises at least one of: (i) a predefined amount of time has elapsed since a previous calibration test of the first sensor or (ii) an occurrence of a predefined event.

10. The system of claim 5, wherein the calibration region is disposed in an unstructured field within the environment.

11. The system of claim 5, wherein the calibration region is disposed in a structured field within the environment.

12. The system of claim 11, wherein:

the calibration region comprises a fiducial marker disposed in a cell location within the structured field; and at least one drive unit further comprises a second sensor configured to detect the fiducial marker.

13. The system of claim 12, wherein transitioning to the calibration region comprises:

moving to the cell location; and after moving to the cell location, determining, via the second sensor, at least one of a first position or a first orientation of the at least one drive unit within the cell location relative to at least one of a second position or a second orientation of the fiducial marker.

14. The system of claim 13, wherein:

the at least one drive unit is at least partially unaligned with respect to fiducial marker in the cell location; and the calibration test of the first sensor at the calibration region is performed based at least in part on information including the at least one of the first position or the first orientation of the at least one drive unit within the cell location relative to the at least one of the second position or the second orientation of the fiducial marker.

15. The system of claim 13, wherein transitioning to the calibration region further comprises at least one of:

upon determining that a difference between the first position and the second position is greater than a first threshold, adjusting the first position of the at least one drive unit within the cell location; or upon determining that a difference between the first orientation and the second orientation is greater than a second threshold, adjusting the first orientation of the at least one drive unit within the cell location.

16. The system of claim 15, wherein after adjusting at least one of the first position or the first orientation of the at least one drive unit, the first sensor is aligned with respect to the calibration apparatus in the calibration region.

17. The computer-implemented method of claim 16, further comprising upon determining that the calibration test has failed, initiating, at the calibration region, a recalibration procedure to correct the calibration of the sensor.

18. The computer-implemented method of claim 16, wherein:

the calibration region is disposed within a structured field in the environment; or the calibration region is disposed within an unstructured field in the environment.

19. A computer-implemented method comprising:

operating a drive unit within an environment, wherein the drive unit comprises a sensor configured to detect one or more objects within the environment;

detecting, while operating the drive unit, at least one predetermined condition associated with a calibration of the sensor;

in response to detecting the at least one predetermined condition, transitioning the drive unit to a calibration region within the environment, wherein the calibration region comprises:

a first target at a first distance from the drive unit; and a second target at a second distance from the drive unit, wherein the second distance is greater than the first distance, and wherein the first target comprises a window portion such that the second target is viewable through the window portion; and performing, at the calibration region, a calibration test of the sensor using a calibration apparatus within the calibration region, wherein the calibration test comprises determining a fill ratio of the sensor based at least in part on a portion of the second target viewable through the window portion.

* * * * *